US012783140B2

(12) United States Patent
Na et al.

(10) Patent No.: US 12,783,140 B2
(45) Date of Patent: Nov. 3, 2026

(54) STORAGE DEVICE, HOST DEVICE AND COMPUTING SYSTEM

(71) Applicant: SK hynix Inc., Icheon-si (KR)

(72) Inventors: Hyeong Ju Na, Icheon-si (KR); Jin Woo Kim, Icheon-si (KR); Young Ho Ahn, Icheon-si (KR); Yoon Won Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/494,201

(22) Filed: Oct. 25, 2023

(65) Prior Publication Data

US 2024/0143211 A1 May 2, 2024

Related U.S. Application Data

(60) Provisional application No. 63/380,990, filed on Oct. 26, 2022.

(30) Foreign Application Priority Data

Sep. 20, 2023 (KR) ........................ 10-2023-0125407

(51) Int. Cl.
*G06F 3/06* (2006.01)

(52) U.S. Cl.
CPC ............ *G06F 3/064* (2013.01); *G06F 3/0659* (2013.01); *G06F 3/0622* (2013.01); *G06F 3/0679* (2013.01)

(58) Field of Classification Search
CPC ...... G06F 3/064; G06F 3/0659; G06F 3/0622; G06F 3/0679
See application file for complete search history.

(56) References Cited

U.S. PATENT DOCUMENTS

2008/0270730 A1* 10/2008 Lasser et al. ....... G06F 12/0246
2011/0010488 A1* 1/2011 Aszmann et al. ...... G06F 3/061
2011/0010489 A1* 1/2011 Yeh ..................... G06F 12/0246
2011/0029749 A1* 2/2011 Yang et al. ......... G06F 12/0246
2011/0225347 A1* 9/2011 Goss et al. .......... G06F 12/0246
2016/0321010 A1* 11/2016 Hashimoto ........... G06F 3/0604
2017/0031626 A1* 2/2017 Kim ...................... G06F 3/0656
2017/0262178 A1* 9/2017 Hashimoto ........... G06F 3/0619
2020/0034287 A1 1/2020 Hashimoto
2020/0167083 A1* 5/2020 Danilak .............. G06F 11/1072
2021/0223954 A1* 7/2021 Yang ....................... G06F 3/064
2021/0240390 A1* 8/2021 Kim ...................... G06F 3/0649
2021/0334022 A1 10/2021 Alrod et al.
2022/0138099 A1 5/2022 Kang
2022/0156008 A1 5/2022 Lee et al.
(Continued)

FOREIGN PATENT DOCUMENTS

KR 10-2019-0032815 A 3/2019
KR 10-2020-0057473 A 5/2020
(Continued)

*Primary Examiner* — Arpan P. Savla
*Assistant Examiner* — Jason Michael Pinga

(57) ABSTRACT

In an embodiment of the disclosed technology, since a host device manages data stored in a storage device on the basis of a zone corresponding to a storage block of the storage device, the load of the storage device may be reduced, and the operation efficiency of the storage device may be increased by the control of the host device. Therefore, it is possible to improve the performance of a computing system including the host device and the storage device.

13 Claims, 22 Drawing Sheets

(56) References Cited

U.S. PATENT DOCUMENTS

| | | | | |
|---|---|---|---|---|
| 2022/0214831 | A1* | 7/2022 | Kim | G06F 3/061 |
| 2022/0214966 | A1 | 7/2022 | Kanno et al. | |
| 2022/0244869 | A1* | 8/2022 | Kanteti | G06F 3/0631 |
| 2022/0269616 | A1* | 8/2022 | Kim | G06F 12/0246 |

FOREIGN PATENT DOCUMENTS

| | | | |
|---|---|---|---|
| KR | 10-2021-0076143 | A | 6/2021 |
| KR | 10-2021-0080967 | A | 7/2021 |
| KR | 10-2022-0014212 | A | 2/2022 |
| KR | 10-2022-0048569 | A | 4/2022 |
| KR | 10-2022-0066601 | A | 5/2022 |

* cited by examiner

FIG.2A

| COMMAND UPIU | | | |
|---|---|---|---|
| 0<br>xx00 0001b | 1<br>Flags | 2<br>LUN | 3<br>Task Tag |
| 4<br>IID \| Command Set Type | 5<br>Reserved | 6<br>Reserved | 7<br>Reserved |
| 8<br>Total EHS Length (00h) | 9<br>Reserved | 10 (MSB)<br>Data Segment (0000h) | 11 (LSB) |
| 12 (MSB)<br>Expected Data Transfer Length | 13 | 14 | 15 (LSB) |
| 16<br>CDB[0] | 17<br>CDB[1] | 18<br>CDB[2] | 19<br>CDB[3] |
| 20<br>CDB[4] | 21<br>CDB[5] | 22<br>CDB[6] | 23<br>CDB[7] |
| 24<br>CDB[8] | 25<br>CDB[9] | 26<br>CDB[10] | 27<br>CDB[11] |
| 28<br>CDB[12] | 29<br>CDB[13] | 30<br>CDB[14] | 31<br>CDB[15] |
| Header E2ECRC (omit if HD=0) | | | |

FIG.2B

| RESPONSE UPIU | | | |
|---|---|---|---|
| 0 xx00 0001b | 1 Flags | 2 LUN | 3 Task Tag |
| 4 IID \| Command Set Type | 5 Reserved | 6 Response | 7 Status |
| 8 Total EHS Length (00h) | 9 Device Information | 10 (MSB) Data Segment Length | 11 (LSB) |
| 12 (MSB) Residual Transfer Count | 13 | 14 | 15 (LSB) |
| 16 Reserved | 17 | 18 | 19 |
| 20 Reserved | 21 | 22 | 23 |
| 24 Reserved | 25 | 26 | 27 |
| 28 Reserved | 29 | 30 | 31 |
| Header E2ECRC (omit if HD=0) | | | |
| k (MSB) Sense Data Length | k+1 (LSB) | k+2 Sense Data[0] | k+3 Sense Data[1] |
| • • • | • • • | • • • | • • • |
| k+16 Sense Data[14] | k+17 Sense Data[15] | k+18 Sense Data[16] | k+19 Sense Data[17] |
| Data E2ECRC (omit if DD=0) | | | |
| NOTE 1 k = 32 if HD =0. | | | |

FIG.3

<WRITE (6) command>

| Byte \ Bit | 7 | 6 | 5 | 4 | 3 | 2 | 1 | 0 |
|---|---|---|---|---|---|---|---|---|
| 0 | OPERATION CODE (0Ah) | | | | | | | |
| 1 | Reserved | | | (MSB) | LOGICAL BLOCK ADDRESS | | | |
| 2 | LOGICAL BLOCK ADDRESS | | | | | | | |
| 3 | LOGICAL BLOCK ADDRESS | | | | | | | (LSB) |
| 4 | TRANSFER LENGTH | | | | | | | |
| 5 | CONTROL = 00h | | | | | | | |

<WRITE (10) command>

| Byte \ Bit | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT = 000b | | | DPO | FUA | Reserved | FUA_NV = 0b | Obsolete |
| 2 | (MSB) LOGICAL BLOCK ADDRESS | | | | | | | |
| 3 | LOGICAL BLOCK ADDRESS | | | | | | | |
| 4 | LOGICAL BLOCK ADDRESS | | | | | | | |
| 5 | LOGICAL BLOCK ADDRESS | | | | | | | (LSB) |
| 6 | Reserved | | | GROUP NUMBER | | | | |
| 7 | (MSB) TRANSFER LENGTH | | | | | | | |
| 8 | TRANSFER LENGTH | | | | | | | (LSB) |
| 9 | CONTROL = 00h | | | | | | | |

<WRITE (16) command>

| Byte \ Bit | 7 | 6 | 5 | 4 | 3 | 2 | 1 | 0 |
|---|---|---|---|---|---|---|---|---|
| 0 | OPERATION CODE (8Ah) | | | | | | | |
| 1 | WRPROTECT = 000b | | | DPO | FUA | Reserved | FUA_NV = 0b | Reserved |
| 2 | (MSB) LOGICAL BLOCK ADDRESS | | | | | | | |
| • • • | LOGICAL BLOCK ADDRESS | | | | | | | |
| 9 | LOGICAL BLOCK ADDRESS | | | | | | | (LSB) |
| 10 | (MSB) TRANSFER LENGTH | | | | | | | |
| • • • | TRANSFER LENGTH | | | | | | | |
| 13 | TRANSFER LENGTH | | | | | | | (LSB) |
| 14 | Reserved[(1)] | Reserved | | GROUP NUMBER | | | | |
| 15 | CONTROL = 00h | | | | | | | |

NOTE 1 Bit 7 of byte 14 shall be ignored.

FIG. 4

<REPORT ZONE command (95h/00h)>

| Byte \ Bit | 7 | 6 | 5 | 4 | 3 | 2 | 1 | 0 |
|---|---|---|---|---|---|---|---|---|
| 0 | OPERATION CODE (95h) | | | | | | | |
| 1 | Reserved | | | SERVICE ACTION (00h) | | | | |
| 2 | (MSB) ZONE START LBA | | | | | | | |
| ••• | | | | | | | | |
| 9 | | | | | | | | (LSB) |
| 10 | (MSB) ALLOCATION LENGTH | | | | | | | |
| ••• | | | | | | | | |
| 13 | | | | | | | | (LSB) |
| 14 | PARTIAL | Reserved | REPORTING OPTIONS | | | | | |
| 15 | CONTROL | | | | | | | |

<REPORT ZONES parameter data>

| Byte \ Bit | 7 | 6 | 5 | 4 | 3 | 2 | 1 | 0 |
|---|---|---|---|---|---|---|---|---|
| 0 | (MSB) ZONE LIST LENGTH (n-63) | | | | | | | |
| ••• | | | | | | | | |
| 3 | | | | | | | | |
| 4 | Reserved | | | | SAME | | | |
| 5 | Reserved | | | | | | | |
| ••• | | | | | | | | |
| 7 | | | | | | | | (LSB) |
| 8 | (MSB) MAXIMUM LBA | | | | | | | |
| ••• | | | | | | | | |
| 15 | | | | | | | | (LSB) |
| 16 | Reserved | | | | | | | |
| ••• | | | | | | | | |
| 63 | | | | | | | | |
| ZONE DESCRIPTOR LIST | | | | | | | | |
| 64 | ZONE descriptor [first] | | | | | | | |
| ••• | | | | | | | | |
| 127 | | | | | | | | |
| ••• | ••• | | | | | | | |
| n-63 | ZONE descriptor [last] | | | | | | | |
| ••• | | | | | | | | |
| n | | | | | | | | |

<RESET WRITE POINTER command (94h/04h)>

| Byte \ Bit | 7 | 6 | 5 | 4 | 3 | 2 | 1 | 0 |
|---|---|---|---|---|---|---|---|---|
| 0 | OPERATION CODE (94h) | | | | | | | |
| 1 | Reserved | | | SERVICE ACTION (04h) | | | | |
| 2 | (MSB) ZONE ID | | | | | | | |
| ••• | | | | | | | | |
| 9 | | | | | | | | (LSB) |
| 10 | Reserved | | | | | | | |
| ••• | | | | | | | | |
| 13 | | | | | | | | |
| 14 | Reserved | | | | | | | (ALL) |
| 15 | CONTROL | | | | | | | |

STORAGE DEVICE, HOST DEVICE AND COMPUTING SYSTEM

CROSS-REFERENCE TO RELATED APPLICATION

The present application claims priority under 35 U.S.C. § 120 to U.S. Provisional Application No. 63/380,990 filed on Oct. 26, 2022 and under 35 U.S.C. § 119(a) to Korean Patent Application No. 10-2023-0125407 filed on Sep. 20, 2023, both of which are incorporated herein by reference in their entirety.

BACKGROUND

1. Technical Field

Various embodiments of the disclosed technology generally relate to a storage device, a host device and a computing system.

2. Related Art

A storage device may include a memory that includes a plurality of memory cells and that stores data. The storage device may include a memory controller that controls the operation of the memory.

For example, the storage device may perform an operation of writing or erasing data in the memory or reading data written to the memory, according to a command received from a host device.

In order to improve the operation of the storage device according to a command of the host device and to improve efficient control by the host device, measures capable of efficiently managing a plurality of storage regions, which store data, in the storage device are disclosed.

SUMMARY

Various embodiments of the disclosed technology are directed to providing measures capable of efficiently managing, by a host device, a plurality of storage regions, in which data are stored, that are included in a storage device.

In an embodiment, a storage device may include: at least one memory including a plurality of storage blocks; and a memory controller configured to control an operation of the at least one memory and to receive a command based on a zone, from among a plurality of zones, that corresponds to a storage block from among the plurality of storage blocks, the command including at least one of cell type information and usage frequency information.

In an embodiment, a host device may include: a host memory configured to store zone meta information for a zone, from among a plurality of zones, set to correspond to a storage block, from among a plurality of storage blocks, in a memory located in a storage device external to the host device; and a host controller configured to transfer a command based on the zone to the storage device, the command including at least one of cell type information and usage frequency information.

In an embodiment, a computing system may include: a storage device including at least one memory; and a host device configured to transfer, to the storage device, a command based on a zone, among a plurality of zones, set to correspond to a storage block, among a plurality of storage blocks that are included in the at least one memory, the command including at least one of cell type information and usage frequency information.

In an embodiment, a storage device may include: at least one memory including a plurality of storage blocks; and a memory controller configured to receive a command based on a zone, from among a plurality of zones, set to correspond to a storage block, from among the plurality of storage blocks including a first open storage block and a second open storage block, and when receiving a garbage collection command for a first zone and a second zone, configured to copy data of the first open storage block corresponding to the first zone to the second open storage block corresponding to the second zone using a valid data bitmap of the first zone.

In an embodiment, a host device may include: a host memory; and a host controller configured to transfer a garbage collection command for a first zone and a second zone to a storage device, and to transfer a valid data bitmap of the first zone to the storage device or load the valid data bitmap of the first zone into the host memory.

In an embodiment, a computing system may include: a storage device including at least one memory; and a host device including a plurality of zones and configured to transfer, to the storage device, a command based on a zone, from among the plurality of zones, set to correspond to a storage block, from among a plurality of storage blocks, included in the at least one memory, wherein, when receiving from the host device a garbage collection command for a first zone and a second zone, from among the plurality of zones, the storage device copies data of a first open storage block corresponding to the first zone to a second open storage block corresponding to the second zone using a valid data bitmap of the first zone.

In an embodiment, a storage device may include: at least one memory including a plurality of open storage blocks; and a memory controller configured to receive a write command based on a zone, included in a plurality of zones, set to correspond to a storage block included in the plurality of open storage blocks, to write data to a first open storage block among the plurality of open storage blocks according to the write command, and to increase a cold point of the first open storage block and increase a cold point of at least one open storage block other than the first open storage block.

In an embodiment, a computing system may include: a storage device including at least one memory; and a host device configured to transfer, to the storage device, a write command based on a zone from among a plurality of zones set to correspond to a storage block from among a plurality of storage blocks included in the at least one memory, wherein the storage device writes data to a first open storage block from among a plurality of open storage blocks according to the write command, decreases a cold point of the first open storage block, and increases a cold point of at least one open storage block other than the first open storage block.

In an embodiment, a storage device may include: at least one memory including a plurality of open storage blocks; and a memory controller configured to receive a write command based on a zone, from among a plurality of zones, that corresponds to an open storage block, from among the plurality of open storage blocks, and when a first logical block address according to a first write command does not match a write pointer of an open storage block, write data according to the first write command to a temporary storage block other than the open storage block and to set an order bitmap of the open storage block.

In an embodiment, a computing system may include: a storage device including at least one memory; and a host device configured to transfer, to the storage device, a write command based on a zone, from among a plurality of zones, that corresponds to an open storage block from among a plurality of open storage blocks included in the at least one memory, wherein, when a logical block address according to the write command does not match a write pointer of an open storage block, the storage device writes data according to the write command to a temporary open storage block other than the open storage block and sets an order bitmap of the open storage block.

In an embodiment, a storage device may include: at least one memory including a plurality of open storage blocks; and a memory controller configured to receive, from a host device, a command based on a zone, from among a plurality of zones, set to correspond to an open storage block from among the plurality of open storage blocks, to control an operation of the at least one memory according to the command, and when a sudden power-off occurs, to transfer write pointer information of at least one open storage block to the host device.

In an embodiment, a host device may include: a host memory configured to store zone meta information for a zone from among a plurality of zones that corresponds to an open storage block from among a plurality of open storage blocks that are included in at least one memory located outside the host device; and a host controller configured to transfer a command based on the zone to a storage device including the at least one memory, receive write pointer information of at least one open storage block from the storage device when a sudden power-off of the storage device occurs, and, based on the write pointer information, modify zone write pointer information or transfer a write command based on the zone write pointer information to the storage device.

In an embodiment, a computing system may include: a storage device including at least one memory; and a host device configured to transfer, to the storage device, a command based on a zone, from among a plurality of zones, set to correspond to an open storage block from among a plurality of open storage blocks included in the at least one memory, wherein, when a sudden power-off occurs, the storage device writes dummy data to a partial region of at least one open storage block, and transfers write pointer information of the at least one open storage block to the host device.

According to embodiments of the disclosed technology, the operational performance of storage devices and control efficiency by the host device may be improved through efficient management of a plurality of storage regions included in a storage device by a host device.

BRIEF DESCRIPTION OF THE DRAWINGS

FIGS. 2A, 2B, 3 and 4 are diagrams illustrating examples of command structures transferred and received in a computing system according to embodiments of the disclosure.

DETAILED DESCRIPTION

Figure 1:
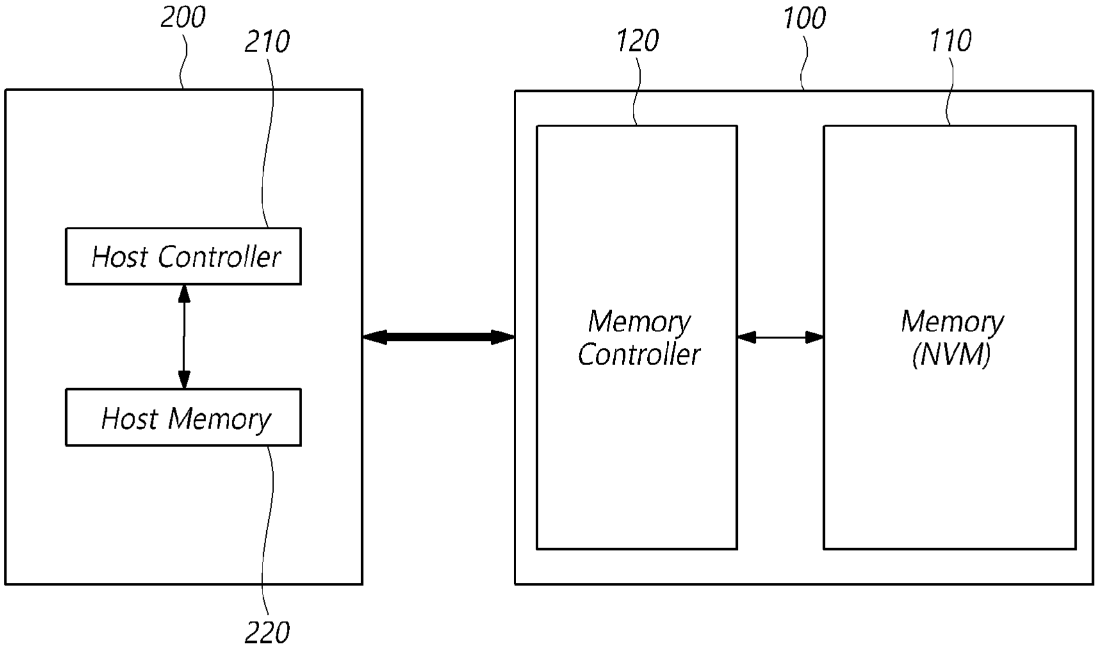
FIG. 1 is a diagram illustrating an example of the configuration of a computing system according to an embodiment of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

FIG. 1 is a diagram illustrating an example of the configuration of a computing system according to an embodiment of the disclosure. FIGS. 2A, 2B, 3 and 4 are diagrams illustrating examples of command structures transferred and received in a computing system according to embodiments of the disclosure.

Referring to FIG. 1, a storage device 100 may include a memory 110 and a memory controller 120 that controls the operation of the memory 110. The storage device 100 may include one or more of the memory 110.

For example, the storage device 100 may operate according to a command received from a host device 200.

The host device 200 may include a host controller 210 and a host memory 220. The storage device 100 and the host device 200 may be collectively referred to as a computing system.

The memory 110 included in the storage device 100 may include a plurality of memory cells. The memory 110 may be, for example, a nonvolatile memory (NVM).

For example, the memory 110 may be implemented into various types of memory, such as a NAND flash memory, a 3D NAND flash memory, a NOR flash memory, a resistive random access memory, a phase-change random access memory, a magnetoresistive random access memory, a ferroelectric random access memory and a spin transfer torque random access memory. The memory 110 may be implemented in a three-dimensional array structure. Embodiments of the disclosure may be applied not only to a flash memory in which a charge storage layer is configured by a floating gate, but also to a charge trap flash in which a charge storage layer includes an insulating film.

The memory 110 may operate in response to the control of the memory controller 120. Operations of the memory 110 may include, for example, a program operation (also referred to as a "write operation"), an erase operation and a read operation.

The memory controller 120 may control program, erase, read and background operations that utilize the memory 110.

For example, the background operation may include at least one among garbage collection, wear leveling, read reclaim and bad block management operations. At least one of background operations or an operation similar to a background operation may be performed under the control of the host device 200.

The memory controller 120 may control the operation of the memory 110 according to a request of a device located outside the storage device 100. In other embodiments, the memory controller 120 may control the operation of the memory 110 regardless of a request from the outside device.

For example, the memory controller 120 may control the operation of the memory 110 according to a request of the host device 200.

The memory controller 120 and the host device 200 may be devices that are separated from each other, or the memory controller 120 and the host device 200 may be implemented by being incorporated into one device. Hereunder, for the sake of convenience in explanation, the description will describe a memory controller 120 and a host device 200 that are separated from each other.

The memory controller 120 may include a host interface that provides an interface for communication with the host device 200.

The memory controller 120 may include a memory interface that provides an interface for communication with the memory 110.

The memory controller 120 may include a control circuit that controls overall operations of the memory controller 120. The control circuit may include, for example, at least one of a processor, a working memory and so on, and may optionally include an error detection and correction circuit.

The processor may perform the function of a flash translation layer (FTL). The processor may translate a logical block address provided by the host device 200 into a physical block address through the flash translation layer. The flash translation layer may receive a logical block address and translate the logical block address into a physical block address using a mapping table.

The mapping table may be created and managed, for example, by a page mapping method, a block mapping method or a hybrid mapping method.

The page mapping method may be a method of mapping and managing logical addresses and physical addresses by units of a page as the smallest unit in which data is written to the memory 110. Because the page mapping method manages mapping information by the unit of a page, a larger storage space in the memory 110 results in a larger mapping table.

The block mapping method may be a method of mapping and managing logical addresses and physical addresses by units of a block. Because the mapping table is created and managed in the unit of a block, which includes a plurality of pages, the size of the mapping table may be reduced as compared to a page mapping method.

A hybrid mapping method may be a method of managing mapping information by mixing the block mapping method and the page mapping method. When the hybrid mapping method is used, for example, the space of the memory 110 may be configured by data blocks and log blocks in which updates to data in the data blocks are recorded. The data blocks may be managed using the block mapping method, and the log blocks may be managed using the page mapping method. In the hybrid mapping method, the number of log blocks may vary depending on the size of page mapping information.

The processor may execute firmware to control the operation of the memory controller 120. In order to control overall operations of the memory controller 120 and perform logical operations, the processor may load and execute (drive) firmware in the working memory upon booting.

A command for controlling the storage device 100 may be transferred to the storage device 100 by the host controller 210 included in the host device 200.

The host controller 210 may mean an overall configuration that controls the operation of the host device 200.

For example, the host controller 210 may mean a configuration that controls a user space where a user application is executed. The host controller 210 may mean a configuration that controls a kernel space as a limited guaranteed region for kernel execution.

In addition, the host controller 210 may mean, for example, a file system such as an F2FS (Flash Friendly File System) or a configuration that manages and controls the file system.

The above-described file system may be, for example, a log-structured file system. The file system may be an F2FS, as a file system for a Linux kernel, that is designed according to characteristics of a flash memory, or may be a journaling flash file system as a Linux log-structured file system that is used in a NOR flash memory device.

The type of the file system is not limited to a log-structured file system. When a file system is a type in which new data is written to a logical address different from a logical address to which existing data is written when a file is updated, embodiments of the disclosure may be applicable.

The host memory 220 may provide a region into which data is loaded when the data is required in the process of performing control operations by the host controller 210.

The host memory 220 may provide a region into which file data is loaded when the file data is provided from a user application to the storage device 100. The host memory 220 may be, as non-limiting examples, a volatile memory such as a DRAM, an SDRAM, a DDR SDRAM, an LPDDR SDRAM and a GRAM.

A command transferred from the host device 200 to the storage device 100 or a response signal transferred from the storage device 100 to the host device 200 may have various structures.

FIGS. 2A, 2B, 3 and 4 are diagrams illustrating examples of the structures of command structures transferred and received in a computing system according to embodiments of the disclosure. FIGS. 2A to 4 illustrate examples of the structures of a command and response signal transferred and received between a host device 200 and a storage device 100 within a computing system.

FIG. 2A includes an example of a structure of a command UPIU in a UFS (Universal Flash Storage) protocol information unit (UPIU). FIG. 2B includes an example of a structure of a response UPIU in a UFS protocol information unit (UPIU).

Referring to FIG. 2A, the command UPIU may include a basic UPIU header and additional information required to specify a command. An initiator device may generate a UPIU and transfer the UPIU to a target device to request an SCSI (Small Computer System Interface) command service performed by the target device. The initiator device may be a host device 200, and the target device may be a storage device 100.

The first 12 bytes of the command UPIU may include the basic header. As a transaction type, the type code value of xx00 0001b may represent the command UPIU. Flags included in the command UPIU may be used to represent various information. Definitions of various flags may be explained by referring to the UFS spec.

There may be no data in the UPIU when a data segment length field is 0. An expected data transfer length may indicate the number of bytes to be transferred, required to complete an SCSI command request appearing in a CDB (command descriptor block). CDB fields may include command descriptor blocks. An initiator ID may indicate the identity of the initiator device. A command set type field may specify an enumerated value indicating that a specific command set is used to define command bytes in the CDB fields.

Referring to FIG. 2B, the response UPIU may include a basic UPIU header, a command and additional information indicating a device level status that results from successful or failed execution of the command. The target device may generate a UPIU, and may transfer the UPIU to the initiator device after completing a requested task.

In addition to the above content, content regarding the structure of the command UPIU and the contents of the response UPIU may be explained by referring to the UFS spec. The command described above or a command to be transferred by the host device 200 may be transferred according to the structure of the command UPIU, as will be described later. A response signal to be transferred by the storage device 100 may be transferred according to the structure of the response UPIU. Information added to a command or a response signal, which will be described later, may be transferred through reserved fields, or may be transferred using a part of existing fields.

A command to be transferred by the host device 200 may be transferred according to an SCSI command set.

FIG. 3 includes an example of a structure of a part of a UFS SCSI command set, and shows, as an example, the structures of a WRITE (6) command, a WRITE (10) command and a WRITE (16) command.

Referring to FIG. 3, a WRITE (6) UFS command, a WRITE (10) UFS command and a WRITE (16) UFS command may request that a device server receive a specified number of logical blocks from an application client and write data to a medium.

Parameters of the WRITE (6) command, the WRITE (10) command and the WRITE (16) command may include, for example, logical block addresses and transfer lengths, which may be explained by referring to the UFS spec. The data transfer of the WRITE (6) command, the WRITE (10) command and the WRITE (16) command may be explained by referring to the UFS spec. The status responses of the WRITE (6) command, the WRITE (10) command and the WRITE (16) command may be explained by referring to the UFS spec.

Information to be transferred by the host device 200, which is described above or will be described later, may be transferred using the reserved field included in the above-described WRITE command or at least a part of fields through which other information is also transferred.

In some embodiments, information may be transferred using a zone block command structure by a host device 200 that manages data by the units of a zone.

FIG. 4 includes examples of structures of a report zone command (95h/00h), report zones parameter data and a reset write pointer command (94h/04h) in a zone block command (ZBC).

Referring to FIG. 4, the report zone command may request a device server to perform an open zone operation. The report zone command may include an operation code field, a service action field, a zone start logical block address field, an allocation length field, partial bits, a reporting options field, control bytes, etc. The respective fields and information included in the report zone command may be explained by referring to the ZBC spec.

An example of the report zones parameter data is shown in FIG. 4. The report zones parameter data may include a zone list length field, a SAME field, a maximum logical block address field, zone descriptors, etc. A zone descriptor format may include a zone type field, a zone status field, NON_SEQ bits, reset bits, a zone length field, a zone start logical block address field, a write pointer logical block address field, etc. The respective fields and information included in the report zones parameter data and the respective fields and information included in the zone descriptor format may be explained by referring to the ZBC spec.

The reset write pointer command may request the device server to perform a reset write pointer operation. The reset write pointer command may include an operation code field, a service action field, a zone ID field, ALL bits, etc., and the respective fields and information included in the reset write pointer command may be explained by referring to the ZBC spec.

A command to be transferred by the host device 200, which is described above or will be described later, may be transferred using the structure of at least one of the report zone command, the report zones parameter data and the reset write pointer command. Information included in a command to be transferred by the host device 200 may be transferred using reserved fields included in the report zone command, the report zones parameter data and the reset write pointer command, or may be transferred using at least a part of the other fields included in the report zone command, the report zones parameter data and the reset write pointer command.

The structure of a command transferred and received between the host device 200 and the storage device 100 may be a command structure specified in each of the UFS spec and the ZBC spec in addition to each of the examples described above. A region where data is stored in the storage device 100 may be managed by being divided by the file system or the host controller 210 described above.

Figure 5:
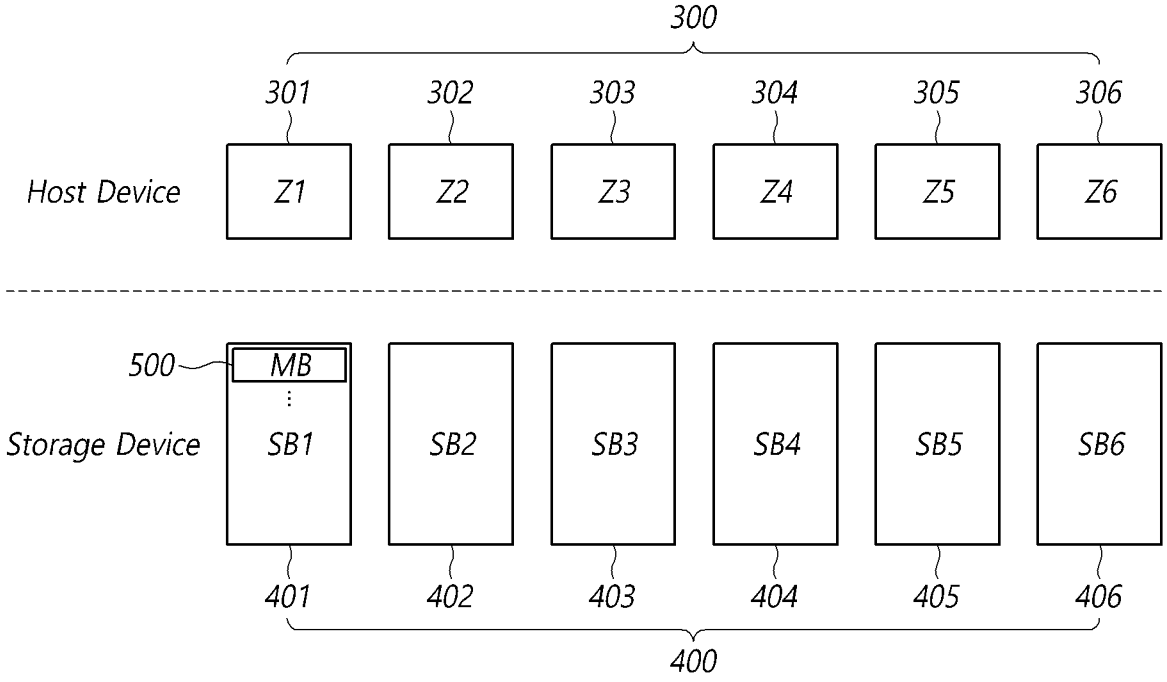
FIG. 5 is a diagram illustrating an example of a method of managing data in a computing system according to an embodiment of the disclosure.

FIG. 5 is a diagram illustrating an example of a method of managing data in a computing system according to an embodiment of the disclosure. A host controller 210 may manage a region where data is stored in the host device 200 by dividing the region into a plurality of zones 300. FIG. 5 shows six zones 301 (Z1), 302 (Z2), 303 (Z3), 304 (Z4), 305 (Z5) and 306 (Z6) by way of an example. Each zone 300 may be a region where user data is stored or may be a region where an attribute of user data or an address of a block storing user data is stored.

The plurality of zones 300 may correspond to a plurality of storage blocks 400, respectively, which are included in a storage device 100.

For example, the six zones 301, 302, 303, 304, 305 and 306 in the host device 200 may correspond to six storage blocks 401 (SB1), 402 (SB2), 403 (SB3), 404 (SB4), 405 (SB5) and 406 (SB6), respectively, of the storage device 100.

Since data may be managed by matching the zones 300 and the storage blocks 400, mapping information between logical addresses and physical addresses in the storage device 100 may be managed in units of a block. By the above-described block mapping method, a mapping table between logical addresses of the host device 200 and the physical addresses of the storage device 100 may be created and managed. When mapping information is managed by in units of blocks, the size of the mapping table may decrease compared to a case where mapping information is managed by units of pages.

In other embodiments, mapping information may be managed using a hybrid mapping method. Among blocks corresponding to the zones 300, mapping information of some blocks such as data blocks may be managed in block units, and mapping information of the other blocks such as log blocks may be managed in page units. Mapping information may be efficiently managed using a structure in which data is managed by matching the zones 300 and the storage blocks 400.

Each of the plurality of storage blocks 400 included in the storage device 100 may include, for example, a plurality of memory blocks 500. Each memory block 500 may mean a region that includes a plurality of memory cells and that stores data.

For example, the size of each of the plurality of storage blocks 400 may be the same as or may be relative to the size of each of the plurality of zones 300. Each of the plurality of zones 300 may have a size that is determined by the size of each of the plurality of storage blocks 400, or vice versa.

For example, each of the plurality of storage blocks 400 may be a super block, which is a unit by which data is stored and managed, in the storage device 100. Each zone 300 managed by the host device 200 may be set on the basis of each super block of the storage device 100.

By managing data to be stored in a zone 300, the host controller 210 may therefore also manage data to be stored in a storage block 400, which corresponds to the zone 300 and is included in the storage device 100.

For example, by writing data to or erasing data from each of the plurality of zones 300, the host controller 210 may also manage that data is written to or erased from each storage block 400, which is included in the storage device 100 and respectively corresponds to one of the plurality of zones 300.

The host device 200 may manage the storage blocks 400 of the storage device 100 through the zones 300, which correspond to the storage blocks 400 of the storage device 100.

In this manner, management of data to be stored in the storage device 100, by the host device 200, may become more efficient.

Since the host device 200 manages the storage blocks 400 of the storage device 100 through the zones 300, the host device 200 may perform various controls on the storage device 100.

In addition, as the host device 200 performs control based on the zones 300, an operation may be efficiently performed in the storage device 100, or an operation capable of complementing control by the host device 200 may be performed.

Figure 6:
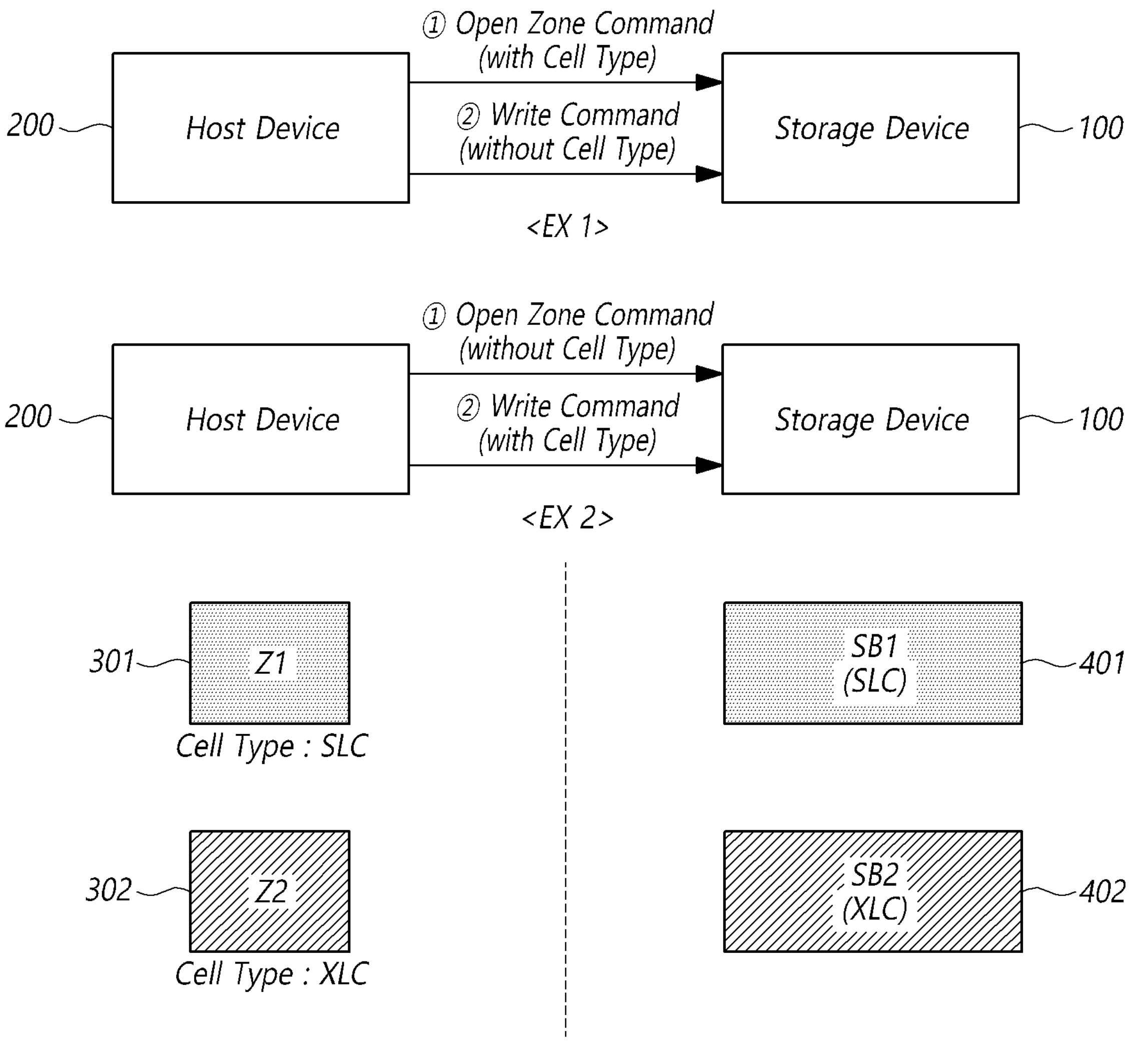
FIGS. 6 to 8 are diagrams illustrating methods in which a storage device operates using cell type information transferred by a host device in a computing system according to embodiments of the disclosure.
Figure 7:
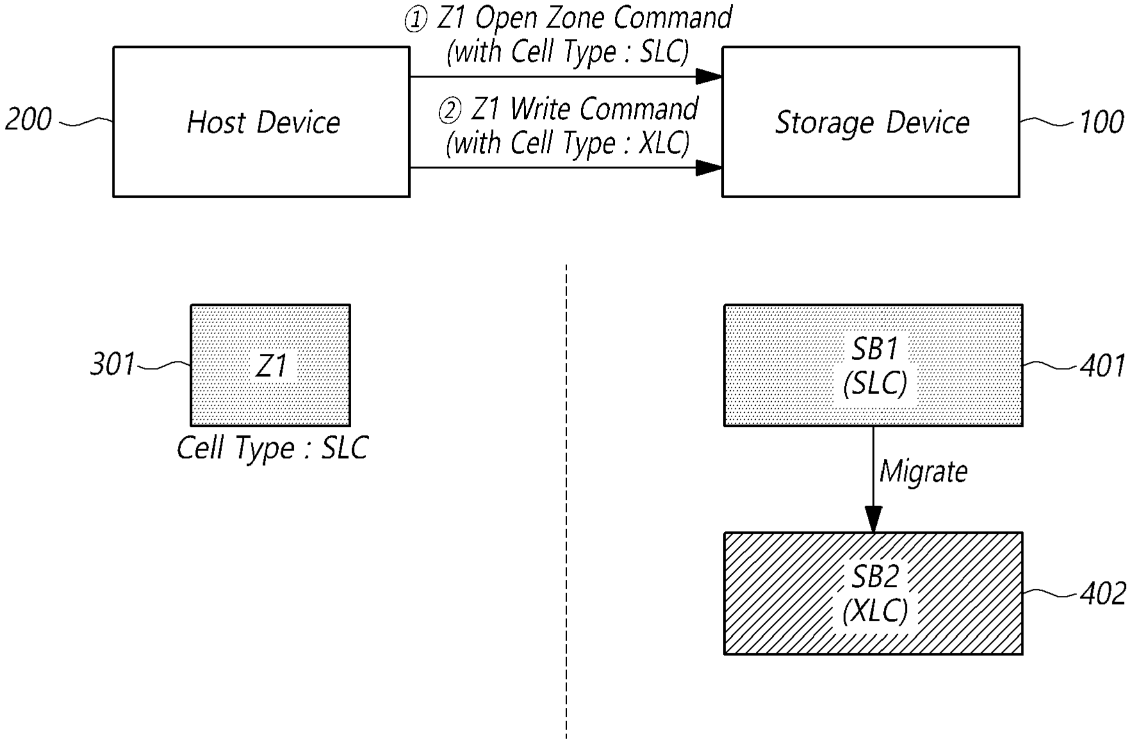
Figure 8:
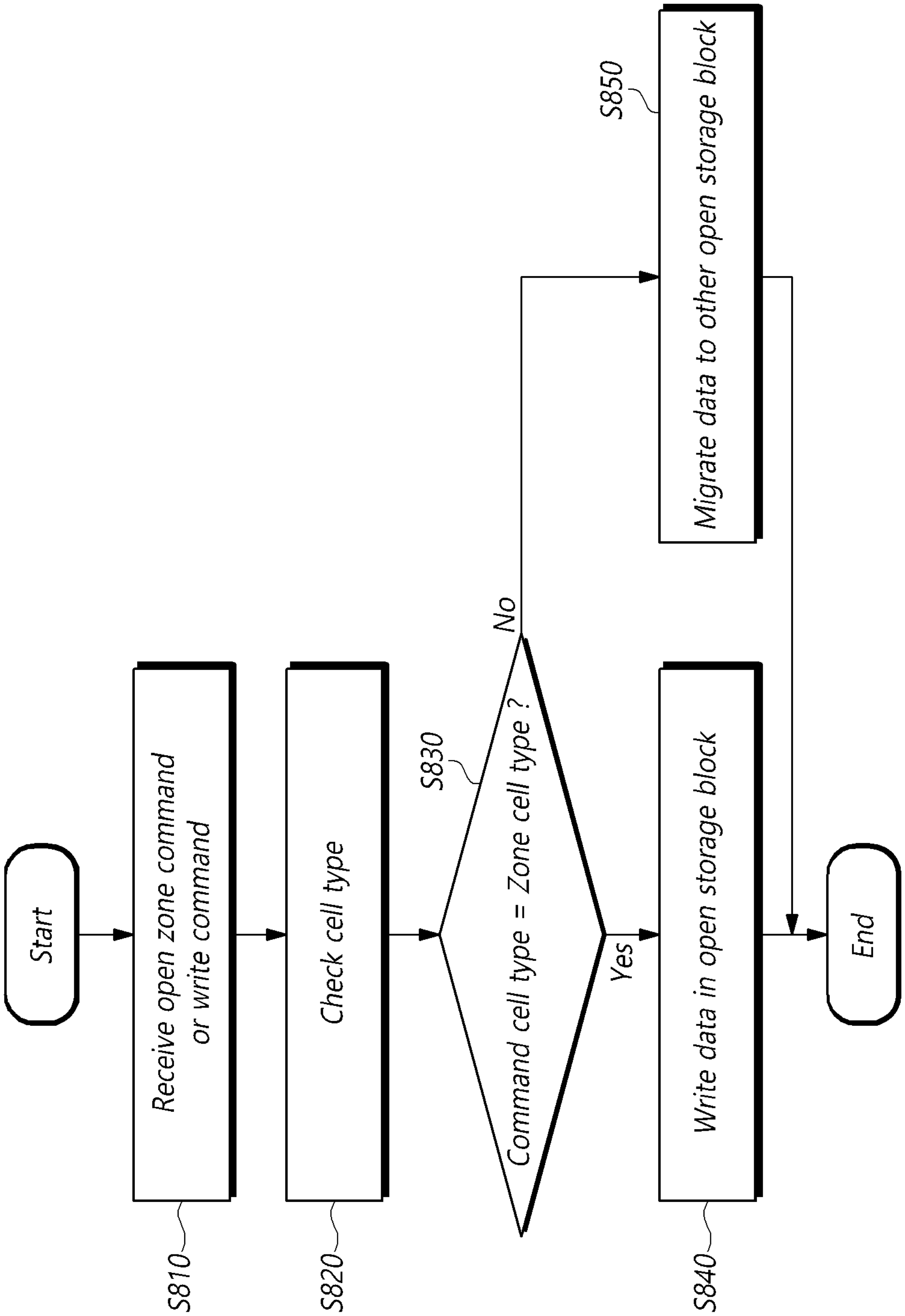

FIGS. 6 to 8 are diagrams illustrating methods in which a storage device operates using cell type information transferred by a host device in a computing system according to an embodiment of the disclosure.

Referring to FIG. 6, a host device 200 may manage a storage block 400 of a storage device 100 by setting a zone 300.

For example, a host controller 210 of the host device 200 may transfer an open zone command to a memory controller 120 of the storage device 100.

The open zone command may be a command that sets or instructs the opening of a new zone 300. When receiving the open zone command, the memory controller 120 of the storage device 100 may set a storage block 400, which corresponds to the zone 300. A storage block 400 that is opened according to an open zone command may be referred to as an open storage block.

The host controller 210 of the host device 200 may transfer a write command to the memory controller 120 of the storage device 100.

The write command may include information on the zone 300. The host controller 210 may transfer a write command, that instructs writing data to a specific zone 300, to the memory controller 120 of the storage device 100.

When receiving the write command from the host controller 210 of the host device 200, the memory controller 120 of the storage device 100 may control an operation of writing data to the storage block 400 that corresponds to the zone 300.

The host device 200 may manage, through the zone 300, data to be stored in the storage block 400 of the storage device 100. Management of mapping relationship between a logical block address in which data is stored in the host device 200 and a physical block address in which data is stored in the storage device 100 may become more efficient.

By including various information in the command to be transferred to the storage device 100, the host device 200 may improve the interface efficiency between the host device 200 and the storage device 100.

For example, referring to <EX 1>, the host device 200 may transfer an open zone command including cell type information to the storage device 100.

The cell type information may be information indicating the type of memory cells included in a storage block 400 that corresponds to a zone 300 opened by the open zone command.

The memory cells included in the storage block 400 may be set to a cell type for storing at least 1-bit data according to settings of the memory controller 120.

For example, each memory cell may be a single-level cell that stores 1-bit data. Alternatively, each memory cell may be a multi-level cell that stores 2-bit data, a triple-level cell that stores 3-bit data or a quad-level cell that stores 4-bit data. In addition, each memory cell may store 5 or more-bit data. The number of bits of data stored in each memory cell may be dynamically determined. For example, a single-level cell that stores 1-bit data may be changed to a triple-level cell that stores 3-bit data.

The cell type information may be, for example, information indicating one of single-level cells, multi-level cells, triple-level cells and quad-level cells. Alternatively, the cell type information may be information indicating one of single-level cells and cells other than single-level cells (non-single-level cells).

On the basis of the cell type information included in the open zone command transferred by the host device 200, the storage device 100 may set the cell type of the storage block 400, which corresponds to the zone 300, according to the open zone command.

For example, the host device 200 may transfer an open zone command that opens a first zone 301, to the storage device 100. The host device 200 may set cell type information included in the open zone command to information indicating single-level cells (SLC).

The storage device 100 may open a first storage block 401 that corresponds to the first zone 301.

The storage device 100 may set the cell type of the memory cells included in the first storage block 401 on the basis of the cell type information included in the open zone command. The cell type of the memory cells included in the first storage block 401 may be set to the single-level cell type according to the cell type information.

The host device 200 may transfer an open zone command that opens a second zone 302 to the storage device 100.

The host device 200 may set cell type information included in the open zone command to information indicating non-single-level cells (XLC). Alternatively, the host device 200 may set cell type information included in the open zone command to information indicating any one of multi-level cells, triple-level cells and quad-level cells.

The storage device 100 may open a second storage block 402 that corresponds to the second zone 302.

The storage device 100 may set the cell type of the memory cells included in the second storage block 402 according to the cell type information included in the open zone command for the second zone 302.

The storage device 100 may set the cell type of the memory cells included in the second storage block 402 to correspond to the cell type information. For example, when the cell type information is information indicating non-single-level cells, the storage device 100 may set the cell type of the memory cells included in the second storage block 402 to a cell type for storing data of the maximum number of bits that may be stored in each memory cell.

After transferring the open zone command, the host device 200 may transfer, to the storage device 100, a write command that instructs writing of the data to the corresponding zone 300.

The host device 200 may transfer the write command including, for example, a logical block address and data, to the storage device 100. The write command may not include cell type information.

When the host device 200 transfers, to the storage device 100, a write command that instructs writing of data to the first zone 301, the storage device 100 may control an operation of writing data to the first storage block 401 corresponding to the first zone 301.

Since the first storage block 401 corresponding to the first zone 301 includes memory cells that operate as single-level cells, a process in which data is written to the first storage block 401 may be performed according to an operation in which data is written to single-level cells. The speed at which data is written to the first storage block 401 may be fast. Data may be stably written to the first storage block 401.

The host device 200 may transfer a write command, to the storage device 100, that instructs to writing of data to the second zone 302.

The storage device 100 may control an operation of writing data to the second storage block 402 corresponding to the second zone 302. The second storage block 402 may include memory cells according to cell type information indicating non-single-level cells. A process in which data is written to the second storage block 402 may be performed according to an operation in which data is written to non-single-level cells. Since two or more-bit data is stored in each memory cell, a large amount of data may be stored in the second storage block 402.

As the host device 200 transfers an open zone command including cell type information to the storage device 100, the cell type of the memory cells included in a storage block 400 to which data is written in the storage device 100 may be managed by the host device 200.

Data may be written to the storage block 400 of the storage device 100 while the host device 200 adjusts data storage speed, stability, amount of data to be stored, and so on for each storage block 400.

Since the host device 200 transfers cell type information through an open zone command, a write command that subsequently instructs writing of data to a storage block 400 corresponding to a zone 300 may not include cell type information.

Alternatively, the host device 200 may transfer a write command including cell type information to the storage device 100.

For example, referring to <EX 2>, the host device 200 may transfer an open zone command that does not include cell type information to the storage device 100.

After a storage block 400 corresponding to a zone 300 is opened, the host device 200 may transfer a write command, which instructs writing of data to the storage block 400, to the storage device 100. The write command may include cell type information.

The storage device 100 may set the cell type of the corresponding storage block 400 according to the cell type information included in the write command.

For example, the storage device 100 may receive a write command for the first zone 301. The write command for the first zone 301 may include cell type information indicating single-level cells.

The storage device 100 may set the memory cells included in the first storage block 401 corresponding to the first zone 301 as single-level cells, and may control an operation of writing data to the first storage block 401.

The storage device 100 may receive a write command for the second zone 302. The write command for the second zone 302 may include cell type information indicating non-single-level cells.

According to the cell type information, the storage device 100 may set the memory cells included in the second storage block 402 corresponding to the second zone 302 as multi-level cells, triple-level cells or the like. Alternatively, the storage device 100 may set the memory cells included in the second storage block 402 to a type for storing the maximum possible number of bits of data.

The storage device 100 may set the cell type of the memory cells included in the second storage block 402 according to the cell type information included in the write command for the second zone 302, and may control an operation of writing data to the second storage block 402.

By transferring, to the storage device 100, an open zone command or a write command by including cell type information in the open zone command or the write command, the host device 200 may manage the cell type of the memory cells included in a storage block 400 corresponding to a zone 300 to which data is to be written. Depending on characteristics of data to be stored in the storage device 100 or required processing performance, the host device 200 may adjust a storage block 400 in which data is stored in the storage device 100.

Alternatively, the host device 200 may transfer, to the storage device 100, an open zone command and a write command by including cell type information in both the open zone command and the write command. For example, the host device 200 may transfer an open zone command including cell type information to the storage device 100. When performing an operation of writing data to a zone 300 opened by the open zone command, the host device 200 may transfer a write command including cell type information to the storage device 100.

The cell type information included in the open zone command transferred from the host device 200 and the cell type information included in the write command transferred from the host device 200 may be the same. In other embodiments, the cell type information included in the open zone command and the cell type information included in the write command may be different.

When the cell type information included in the open zone command and the cell type information included in the write command are different, an operation of migrating data in the storage device 100 according to the cell type information may be performed.

For example, referring to FIG. 7, a host device 200 may transfer an open zone command including cell type information to a storage device 100. The open zone command may be a command which instructs to open a first zone 301. The cell type information included in the open zone command may be information indicating single-level cells.

The storage device 100 may set a first storage block 401 corresponding to the first zone 301 according to the open zone command. The memory cells included in the first storage block 401 may be set as single-level cells.

The host device 200 may transfer a write command for the first zone 301 to the storage device 100.

The write command may not include cell type information. In other embodiments, the write command may include cell type information indicating single-level cells, and the storage device 100 may perform an operation of writing data to the first storage block 401, which corresponds to the first zone 301 and includes the memory cells set as single-level cells.

The write command may include cell type information indicating a cell type other than single-level cells.

For example, the write command may include cell type information indicating multi-level cells, triple-level cells or non-single-level cells.

When the cell type information included in the write command for the first zone 301 is different from the cell type of the memory cells included in the first storage block 401 corresponding to the first zone 301, the storage device 100 may control an operation of migrating data stored in the first storage block 401.

For example, the storage device 100 may set memory cell types of the second storage block 402 according to the cell type information included in the write command. The memory cells included in the second storage block 402 may be set as multi-level cells or triple-level cells depending on the cell type information included in the write command.

The storage device 100 may perform an operation of migrating data stored in the first storage block 401 corresponding to the first zone 301 to the second storage block 402. Data of the first storage block 401, which includes memory cells set as single-level cells, may be moved to the second storage block 402, which includes memory cells set as multi-level cells or triple-level cells.

In addition, the cell type set for the first zone 301 by the host device 200 may be changed to a cell type indicating multi-level cells or triple-level cells. The cell type set for the first zone 301 may become the same as the cell type of the memory cells included in the second storage block 402.

The first zone 301 in the host device 200 and the second storage block 402 in the storage device 100 may correspond to each other. The first storage block 401 of the storage device 100 may be associated with a different zone 300.

An operation, in which data of a storage block 400 including memory cells set as single-level cells is migrated to a different storage block 400 including memory cells set as cells other than single-level cells, may be controlled depending on cell type information, included in a command from the host device 200, that is transferred by the host device 200.

The host device 200 may efficiently control the cell type of a storage block 400 in which data is stored and the migration of data.

Briefly describing, with reference to FIG. 8, an operation of a storage device 100 according to disclosed embodiments, the storage device 100 may receive an open zone command or a write command from a host device 200 (S810).

The open zone command or the write command may include cell type information.

The storage device 100 may check the cell type information included in the open zone command or the write command (S820).

The storage device 100 may check whether the cell type information included in the open zone command or the write command is the same as existing cell type information set for a corresponding zone 300 (S830).

When the cell type information included in the write command is the same as the existing cell type information set for the corresponding zone 300, the storage device 100 may write data to a storage block 400 that corresponds to the zone 300, which is opened (S840).

When the cell type information included in the open zone command or the write command is not the same as the existing cell type information set for the corresponding zone 300, the storage device 100 may migrate data stored in a storage block 400 that corresponds to the open zone 300, to a newly opened storage block 400 (S850). The newly opened storage block 400 is changed to correspond to the zone 300, and data may be subsequently written to the corresponding newly opened storage block 400.

Since the host device 200 may adjust the cell type of a storage block 400 of the storage device 100, the efficiency of an operation in which data is stored in the storage device 100 by the host device 200 may be improved.

When the host device 200 instructs a cell type indicating single-level cells, the advantage of a write operation according to a write booster may be provided. As the host device 200 changes a cell type, a time point when the written data is to be migrated in a write booster operation can be controlled.

When the host device 200 transfers or does not transfer cell type information, the operational performance of a write booster may be improved through management of a storage block 400 in the storage device 100.

FIGS. 9 to 12 are diagrams illustrating methods in which a storage device 100 manages cell types of storage blocks according to write commands transferred from a host device in a computing system according to embodiments of the disclosure.

Figure 9:
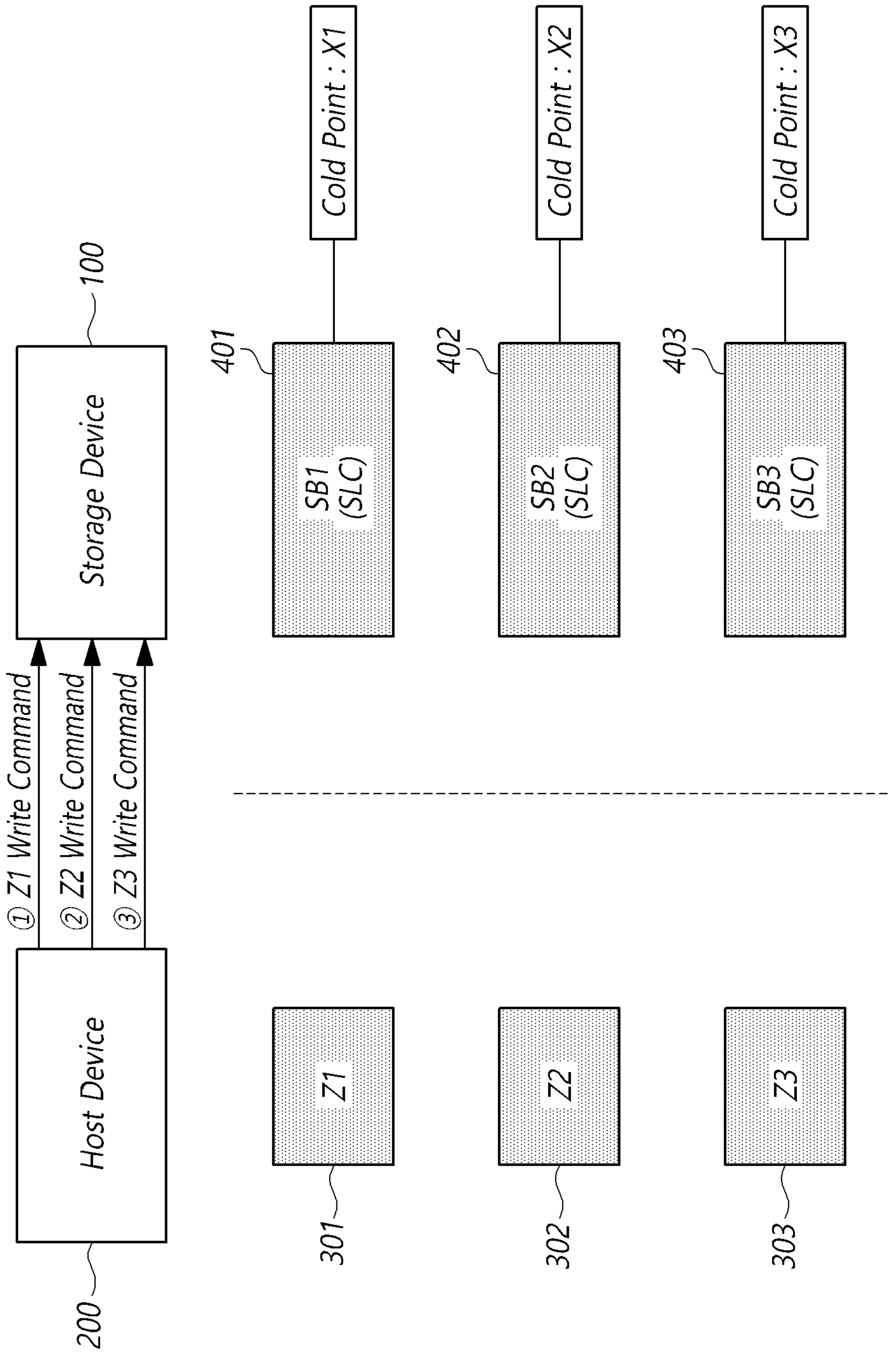
FIGS. 9 to 12 are diagrams illustrating methods in which a storage device manages cell types of storage blocks according to write commands transferred from a host device in a computing system according to embodiments of the disclosure.

In FIG. 9, a host device 200 controls write operations on three zones 301, 302 and 303. For example, the host device 200 may open the first zone 301, the second zone 302 and a third zone 303, and may control operations of writing data to the respective zones 300.

A storage device 100 may open a first storage block 401 according to an open zone command for the first zone 301. The storage device 100 may set the memory cells included in the first storage block 401 as single-level cells.

The storage device 100 may set the memory cells included in the first storage block 401 as single-level cells according to cell type information included in the open zone command or a write command received from the host device 200.

In other embodiments, in order to perform a write operation with a write booster, the storage device 100 may set the memory cells included in the first storage block 401 as single-level cells according to a write command received from the host device 200, and may perform a write operation on the first storage block 401.

Similarly, the storage device 100 may set the memory cells included in the second storage block 402 as single-level cells according to a write command for the second zone 302 of the host device 200, and may perform an operation of writing data to the second storage block 402. The storage device 100 may set the memory cells included in a third storage block 403 as single-level cells according to a write command for the third zone 303 of the host device 200, and may perform an operation of writing data to the third storage block 403.

By setting the memory cells included in the first storage block 401, the second storage block 402 and the third storage block 403 as single-level cells, the storage device 100 may manage each storage block 400 as a storage block 400 for a write operation with a write booster.

The storage device 100 may set and manage a cold point of a storage block 400 for a write booster operation.

A cold point may be a value that is set according to a frequency of access to a storage block 400 for a write booster operation or a frequency at which data is written to a storage block 400 for a write booster operation.

For example, as data is written to each storage block 400 according to a write command, the storage device 100 may set the cold point of the storage block 400.

When a write operation is performed on any one of storage blocks 400 for a write booster, the storage device 100 may update the cold point of the storage block 400 for a write booster.

For example, when a write operation is performed on the first storage block 401, the storage device 100 may decrease a cold point X1 of the first storage block 401.

The storage device 100 may increase the cold points of storage blocks 400 other than the first storage block 401. Storage blocks 400 whose cold points are increased may be storage blocks 400 that operate with a write booster. For example, the storage device 100 may increase a cold point X2 of the second storage block 402 and a cold point X3 of the third storage block 403.

When a write operation is performed on the second storage block 402, the storage device 100 may decrease the cold point X2 of the second storage block 402.

The storage device 100 may increase the cold point X1 for the first storage block 401 and the cold point X3 for the third storage block 403.

The storage device 100 may manage the cold point of each storage block 400 that operates with a write booster.

When the cold point of a storage block 400 is equal to or greater than a preset threshold value, the storage device 100 may perform an operation of migrating data of that storage block 400 to another storage block 400.

Figure 10:
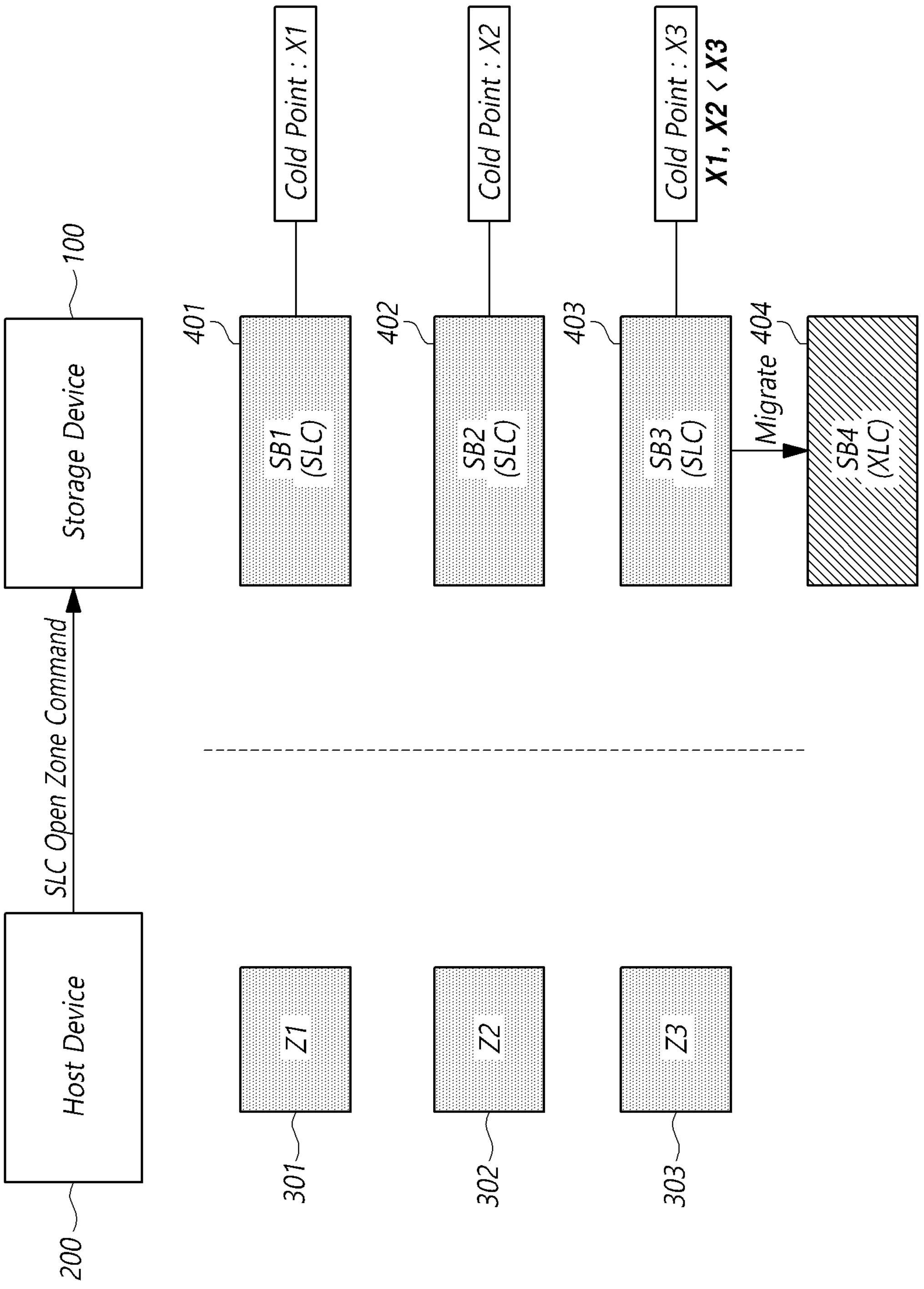

For example, referring to FIG. 10, the cold point X3 of the third storage block 403 may be greater than the cold point X1 of the first storage block 401 and may be greater than the cold point X2 of the second storage block 402. The cold point X3 of the third storage block 403 may be greater than a preset threshold value.

The storage device 100 may set a fourth storage block 404 as a destination for migrating data of the third storage block 403. For example, the fourth storage block 404 may be set as a storage block 400 that includes memory cells of a cell type other than single-level cells, such as multi-level cells or triple-level cells.

The storage device 100 may migrate the data of the third storage block 403 to the fourth storage block 404. As a result, the storage block 400 corresponding to the third zone 303 may be changed from the third storage block 403 to the fourth storage block 404.

The storage device 100 may set the third storage block 403 as a storage block 400 for use with a new write booster. When the usage frequency is low for a zone 300 corresponding to a storage block 400 that is opened for a write booster, it is possible to prevent or reduce deterioration of the usability of storage blocks 400 for a write booster by selecting the storage block 400 that corresponds to a zone 300 with low usage frequency.

The storage device 100 may manage the cold point of each storage block 400 for the use of a write booster in the form of a score or a grade.

Figure 11:
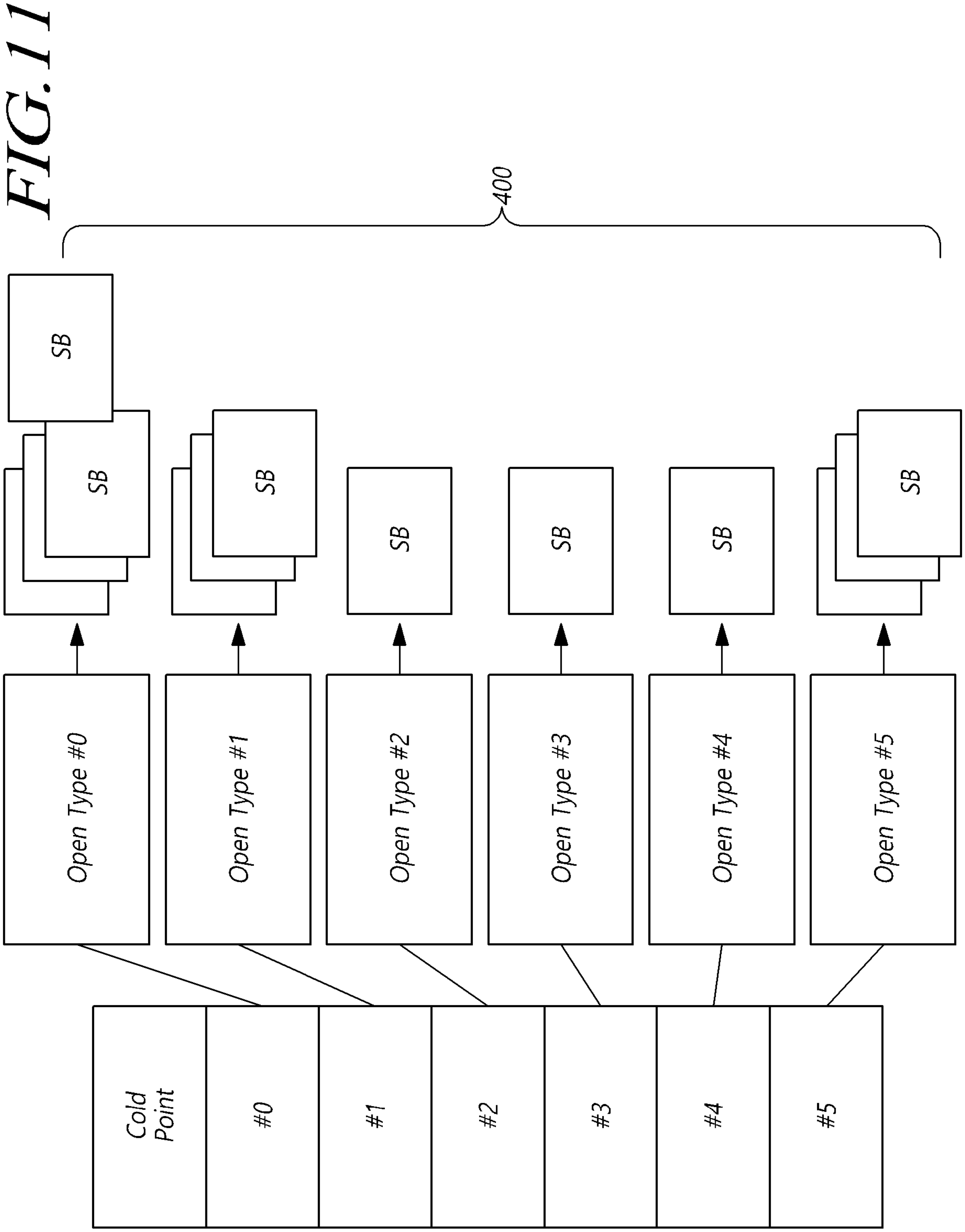

For example, FIG. 11 illustrates, a method of managing cold points of storage blocks 400 for use in a write booster.

In an example, storage device 100 may manage cold points using six grades or scores. A cold point corresponding to #0 may have the lowest value and a cold point corresponding to #5 may have the highest value.

When a write booster will be used, data is written to a storage block 400, the storage device 100 may decrease the cold point of the corresponding storage block 400 by one level and may increase the cold points of the other storage blocks 400 by one level.

The storage device 100 may adjust the increase in a cold point by different amounts depending on the remaining size of a storage block 400 for a write booster.

For example, when the remaining size of a storage block 400 is smaller than a reference value, the storage device 100 may increase the cold point of the corresponding storage block 400 by one level. When the remaining size of a storage block 400 is equal to or larger than the reference value, the storage device 100 may increase the cold point of the corresponding storage block 400 by two levels. Among the storage blocks 400, a storage block 400 with a low access frequency and a large remaining size may be preferentially reconfigured as a storage block 400 for use in a write booster.

The storage device 100 may separately manage storage blocks 400 corresponding to each cold point grade. When storage blocks 400 are insufficient (e.g., a case that storage blocks 400 being usable for a write booster don't exist, a case that a number or a size of the storage blocks 400 being usable for a write booster is smaller than a certain value) or the cold point of a storage block 400 is too high and requires a new setting, the storage device 100 may migrate data of at least one storage block 400 to a destination storage block. The storage block from which data is migrated may be set as a new storage block 400 for a write booster.

The storage device 100 may set a time point when a new storage block 400 for a write booster is to be set, on the basis of the total size of storage blocks 400 for a write booster or on the basis of the remaining size of each storage block 400.

For example, when the remaining size of all storage blocks 400 being usable for a write booster is smaller than a reference margin, the storage device 100 may select a storage block 400, from among the storage blocks 400, whose data is to be migrated. The storage device 100 may migrate the data of the selected storage block 400 to a new storage block 400 which is not used for a write booster. The storage device 100 may set the storage block 400 whose data has been migrated, as a new storage block 400 for the write booster.

In another example, when the remaining size of storage blocks 400 with high usage frequencies, from among storage blocks 400, is smaller than a reference margin, the storage device 100 may perform an operation for setting a new storage block 400 for a write booster. At a time point when a new storage block 400 is required, an operation may be performed to set some of storage blocks 400 with higher cold points as new storage blocks 400 for a write booster. As a result, a situation is avoided in which storage blocks 400 for a write booster are insufficient, and the operational performance of the write booster by the storage device 100 may be improved.

The storage device 100 may use the cold point of a storage block 400 to improve the performance of an operation other than a write booster.

For example, when performing a garbage collection or wear leveling operation, the storage device 100 may select a storage block 400 whose data is to be migrated or select a storage block 400 to which data is to be written, based on the cold point of each storage block 400.

The operational efficiency of a storage block 400 may be directly increased by specifying cell type information by the host device 200, or the operational efficiency of a storage block 400 may be increased by cold point management by the storage device 100. In addition, the cold point management of the storage device 100 may be used even when the host device 200 specifies cell type information.

Figure 12:
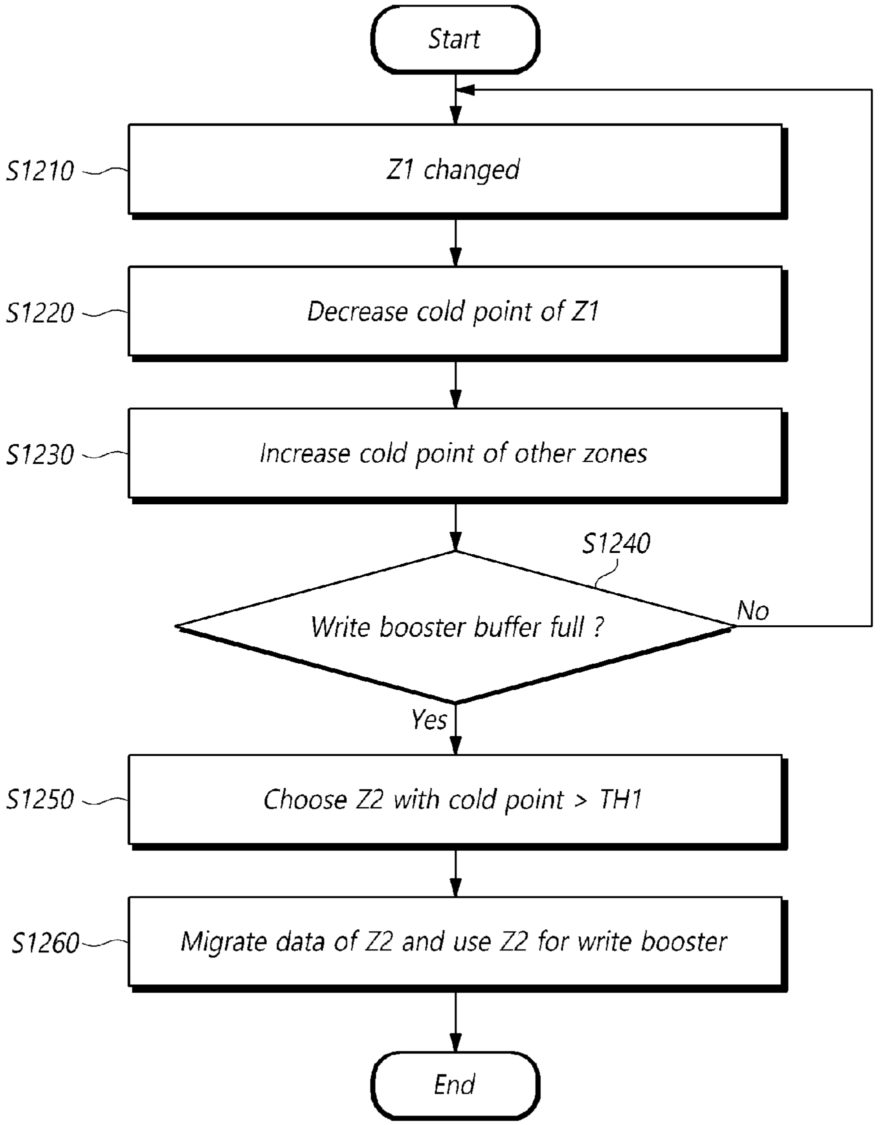

In FIG. 12, an operation of a storage device 100 as described above is illustrated. The storage device 100 may receive, from the host device, a command to change data of a first zone 301 200 (S1210). The command may be a command for writing data to the first zone 301.

The storage device 100 may write data to a first storage block 401 corresponding to the first zone 301. The storage device 100 may decrease the cold point of the first storage block 401 corresponding to the first zone 301 (S1220). The cold point of the first zone 301 is also decreased.

The storage device 100 may increase the cold points of storage blocks 400 that correspond to remaining zones 300 other than the first zone 301 (S1230).

The storage blocks 400 corresponding to the remaining zones 300 may be storage blocks 400 that are set as storage blocks 400 for a write booster.

The storage device 100 may check a degree to which a buffer for a write booster is filled (S1240).

When the buffer for a write booster is not full, the storage device 100 may perform a write operation according to a write command while managing the cold point of each zone 300 and/or each storage block 400.

When the buffer for a write booster is full, the storage device 100 may select a storage block 400, from among the storage blocks 400, to be reconfigured for use with a write booster.

When the cold point of a second storage block 402 corresponding to a second zone 302 is greater than a first threshold value TH1, the storage device 100 may select the second storage block 402 as a storage block 400 to reconfigure (S1250).

The storage device 100 may migrate data of the second storage block 402 corresponding to the second zone 302 to a new storage block 400 that corresponds to a zone 300 other than the second zone 302 (S1260). The cell type of the memory cells included in the new storage block 400 to which the data of the second storage block 402 is migrated may not be a cell type indicating single-level cells. The cell type of the memory cells included in the second storage block 402, however, may maintain the cell type indicating single-level cells and the second storage block 402 may be used as a storage block 400 for a write booster, while the new storage block 400 to which data is migrated is excluded from use with a write booster.

As the storage device 100 manages the cold point of each zone 300 and/or each storage block 400, the performance of a system in which the host device 200 manages storage blocks 400 on the basis of zones 300 may be further improved.

The host device 200 may provide the storage device 100 with other information on each zone 300 in addition to cell type information. The host device 200 or the storage device 100 may improve the operational performance of the host device 200 or the storage device 100 using the other information.

Figure 13:
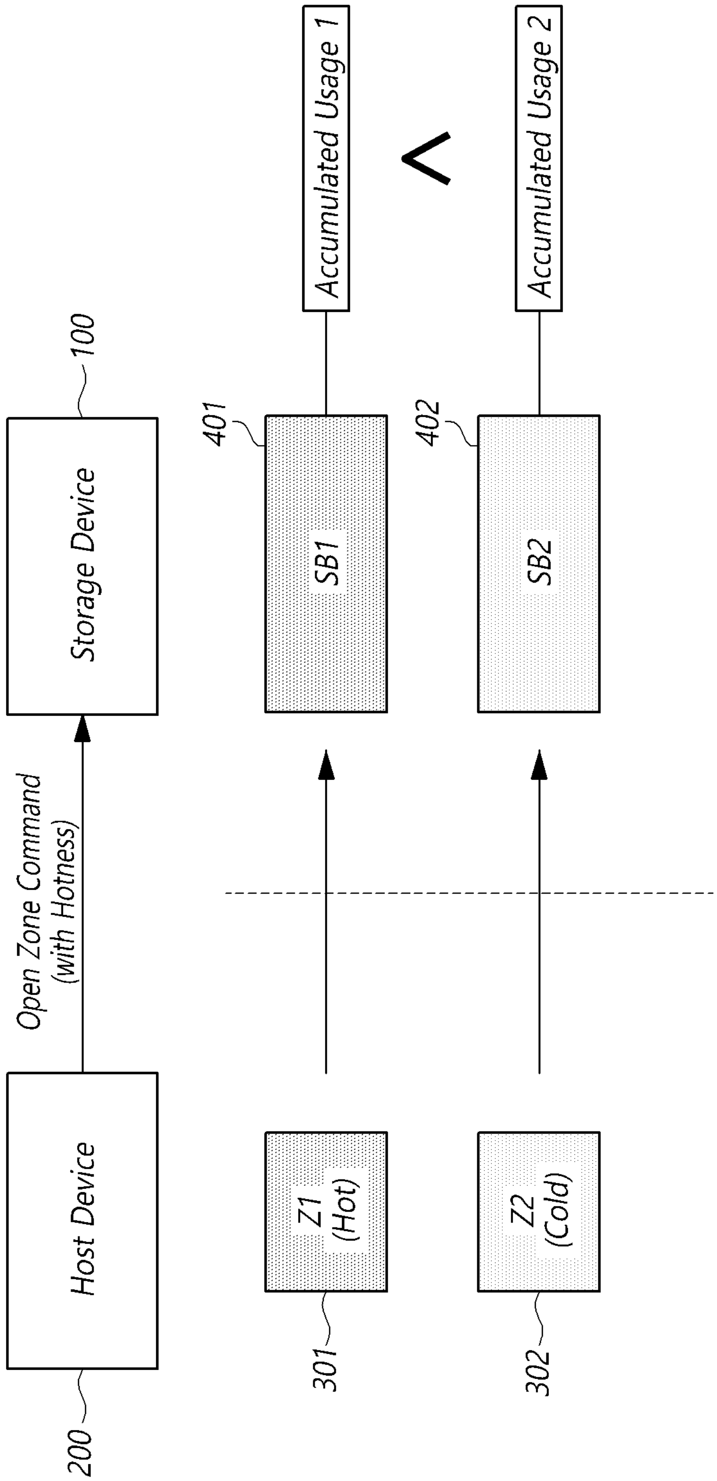
FIG. 13 is a diagram illustrating a method in which a storage device operates using usage frequency information transferred by a host device in a computing system according to embodiments of the disclosure.

FIG. 13 is a diagram illustrating a method in which a storage device operates using usage frequency information transferred by a host device in a computing system according to embodiments of the disclosure.

Referring to FIG. 13, a host device 200 may transfer a command including usage frequency information to a storage device 100.

The command including usage frequency information may be, for example, an open zone command or a write command.

The usage frequency information may be information corresponding to the usage frequency of data written to a corresponding zone 300. The usage frequency information may be information indicating whether data written to a corresponding zone 300 is hot data or cold data.

The storage device 100 may set or manage a storage block 400 corresponding to each zone 300 using the usage frequency information received from the host device 200.

For example, the storage device 100 may set a storage block 400 corresponding to each zone 300 on the basis of usage frequency information of each zone 300 and accumulated usage information of each storage block 400.

The storage device 100 may receive, from the host device 200, an open zone command or a write command for each of a first zone 301 in which hot data is written and a second zone 302 in which cold data is written. A usage value representing accumulated usage information of a first storage block 401 included in the storage device 100 may be smaller than a usage value representing accumulated usage information of a second storage block 402 included in the storage device 100.

The storage device 100 may set the first storage block 401 as a storage block 400 corresponding to the first zone 301. The storage device 100 may set the second storage block 402 as a storage block 400 corresponding to the second zone 302.

Efficient management of each storage block 400 of the storage device 100 may be implemented using usage frequency information included in command transferred by the host device 200.

The host device 200 may transfer, to the storage device 100, valid page count information by including the valid page count information in a command. For example, the host device 200 may transfer, to the storage device 100, valid page count information, cell type information and usage frequency information in a command. In other embodiments, the host device 200 may transfer, to the storage device 100, valid page count information by including the valid page count information instead of usage frequency information in a command.

The storage device 100 may change and manage usage frequency information for a corresponding zone 300 according to the number of changes in valid page count information. The storage device 100 may set a storage block 400 corresponding to a zone 300 or control data migration between storage blocks 400 based on the number of changes in valid page count information.

In other embodiments, the storage device 100 may control data migration based on a garbage collection command received from the host device 200.

The storage device 100 may select a storage block 400 as a target for data migration by using valid page count information, or the storage device 100 may receive, as a bitmap, information on valid data and use that information when performing garbage collection.

Figure 14:
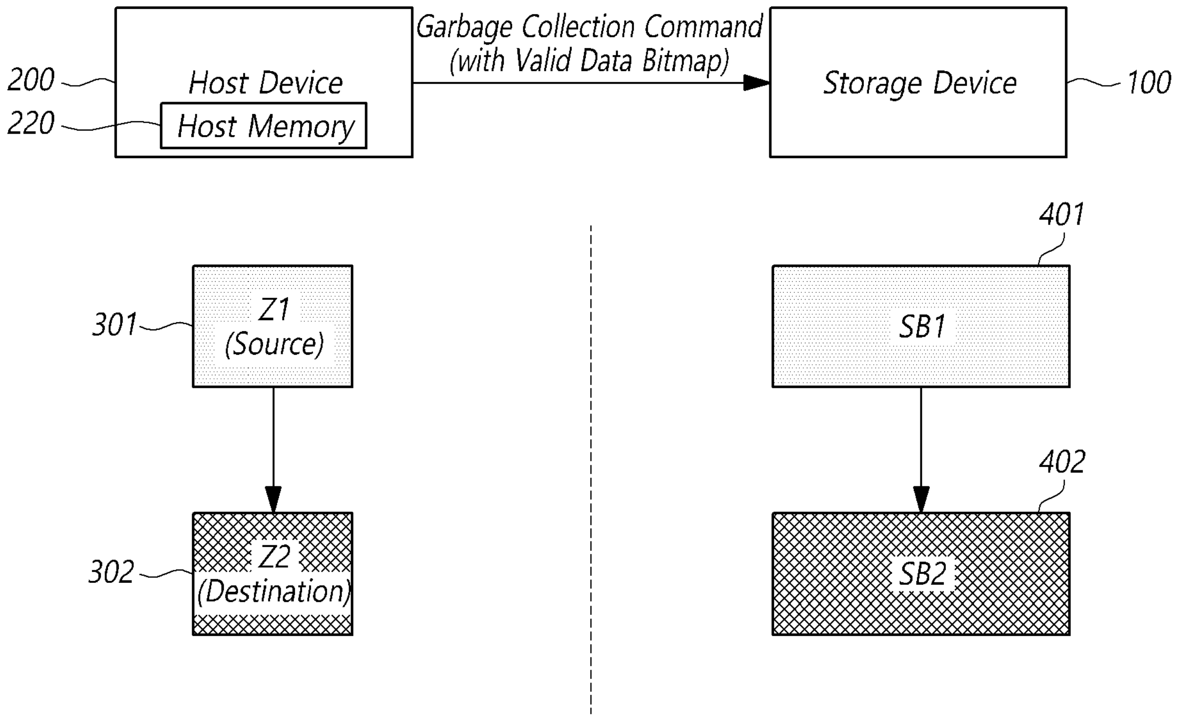
FIGS. 14 and 15 are diagrams illustrating methods in which a storage device operates according to a garbage collection command transferred by a host device in a computing system according to embodiments of the disclosure.
Figure 15:
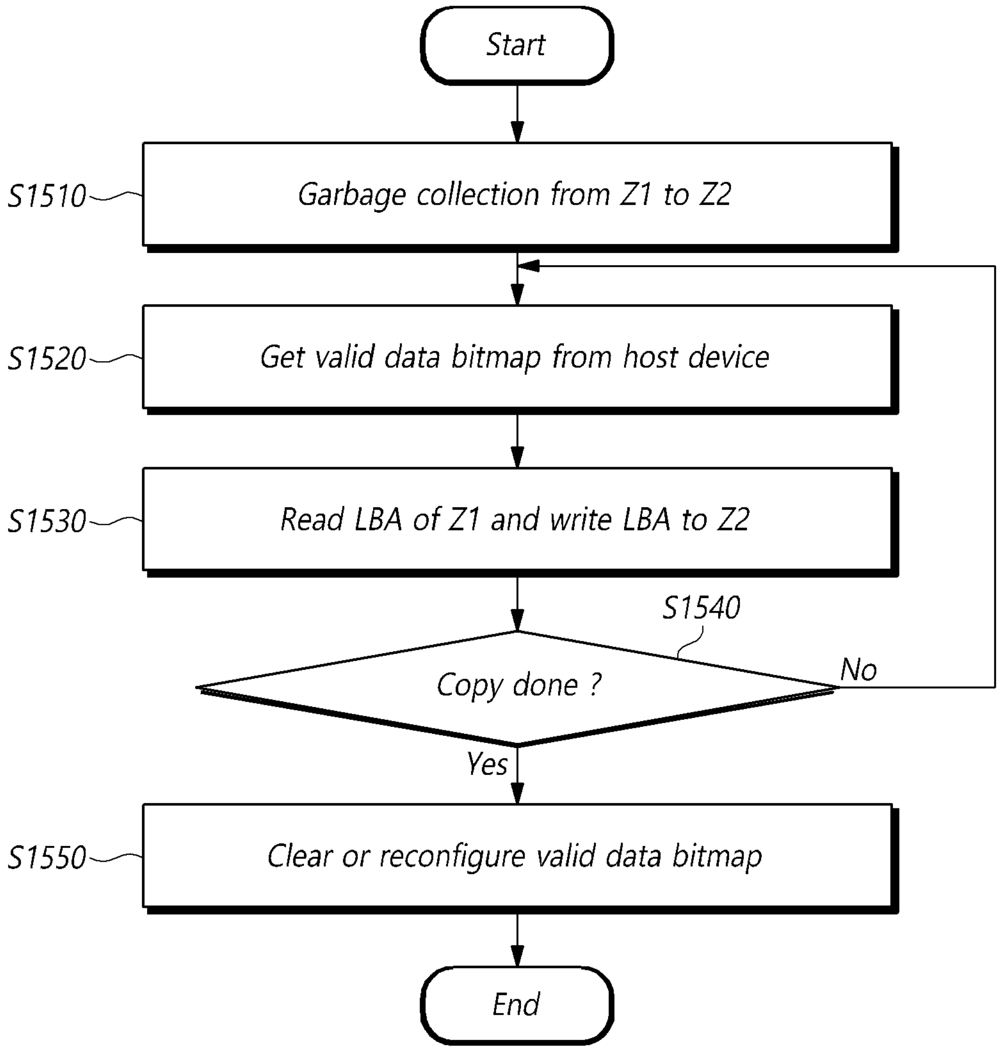

FIGS. 14 and 15 are diagrams illustrating methods in which a storage device operates according to a garbage collection command transferred by a host device in a computing system according to embodiments of the disclosure.

Referring to FIG. 14, a host device 200 may transfer a garbage collection command to a storage device 100.

The storage device 100 may internally control a time point and an operation of performing garbage collection, but may also perform a garbage collection operation according to a garbage collection command received from the host device 200.

The garbage collection command transferred by the host device 200 may include a valid data bitmap. In some embodiments, the valid data bitmap may be transferred separately from the garbage collection command. In other embodiments, the valid data bitmap may be provided through a host memory 220 included in the host device 200.

For example, the host device 200 may transfer a garbage collection command to the storage device 100, and the transfer may correspond to an operation of migrating data from a first zone 301 to a second zone 302.

In another example, the host device 200 may transfer, to the storage device 100, a command for migrating or copying data from the first zone 301 to the second zone 302. A command for copying data to the second zone 302 may be received as a garbage collection command by the storage device 100.

The first zone 301 may correspond to a source zone or a source storage block, and the second zone 302 may correspond to a destination zone or a destination storage block.

As data of the first zone 301 is moved to the second zone 302 by the host device 200, data migration may be performed in the storage device 100. Data in the first storage block 401 corresponding to the first zone 301 may be migrated to the second storage block 402 corresponding to the second zone 302.

The storage device 100 may migrate data of the first storage block 401 to the second storage block 402 using a valid data bitmap provided from the host device 200.

The storage device 100 may check, from the valid data bitmap, a valid logical block address in the first zone 301 corresponding to the first storage block 401, and may write data of the valid logical block address to the second storage block 402 corresponding to the second zone 302.

Since the storage device 100 performs garbage collection on the basis of the valid data bitmap provided from the host device 200, a load for performing garbage collection in the storage device 100 may be reduced. Also, since the host device 200 performs garbage collection based on the state of each zone 300, garbage collection may be efficiently performed at a time point when garbage collection is required.

While the host device 200 may transfer and provide a valid data bitmap for garbage collection to the storage device 100, a valid data bitmap may instead be provided through the host memory 220.

For example, the host device 200 may load a valid data bitmap into the host memory 220. The host device 200 may load the valid data bitmap before moving or copying data from the first zone 301 to the second zone 302.

The host device 200 may load the valid data bitmap, and then, may migrate data from the first zone 301 to the second zone 302. The host device 200 may transfer a command, for writing data from the first zone 301 to the second zone 302, to the storage device 100. Alternatively, the host device 200 may transfer a garbage collection command to the storage device 100.

On the basis of the valid data bitmap, the storage device 100 may migrate data from the first storage block 401 corresponding to the first zone 301 to the second storage block 402 corresponding to the second zone 302.

Since a garbage collection operation may be controlled by the host device 200 and data migration may be facilitated in the storage device 100 through the valid data bitmap, the efficiency of the garbage collection operation may be improved.

FIG. 15 illustrates operations of the host device 200 and the storage device 100 as described above, in which garbage collection moves data of the first zone 301 to the second zone 302 in the host device 200 (S1510).

The storage device 100 may be provided with a valid data bitmap from the host device 200 (S1520). The storage device 100 may receive the valid data bitmap transferred by the host device 200. In other embodiments, the storage device 100 may read the valid data bitmap which is loaded into the host memory 220 by the host device 200.

The storage device 100 may read data at a logical block address of the first zone 301, and may write the data to a logical block address of the second zone 302 (S1530). The storage device 100 may write data of the first storage block 401 corresponding to the first zone 301 to the second storage block 402 corresponding to the second zone 302.

When data movement is completed (S1540), the valid data bitmap may be cleared or reconfigured (S1550).

For example, when data of the first zone 301 is completely moved to the second zone 302, the host device 200 may clear the valid data bitmap of the first zone 301. The host device 200 may reconfigure the valid data bitmap of the second zone 302.

In other embodiments, the storage device 100 may clear the valid data bitmap that is loaded into the host memory 220.

Since the garbage collection operation is performed based on the control of zones 300 by the host device 200 and the valid data bitmap provided by the host device 200, the load of the storage device 100 for garbage collection operations may be reduced, and the efficiency of garbage collection operations may be improved.

In this way, the efficiency of an operation to be performed in the storage device 100 may be improved by the control of the host device 200.

The host device 200 can control the management of zones 300 corresponding to operations performed in the storage device 100 to reduce or prevent operational errors.

For example, when a sudden power-off occurs in the storage device, the host device 200 may perform control operations that prevent degradation of the usage efficiency of the storage blocks 400 resulting from a recovery from the sudden power-off.

Figure 16:
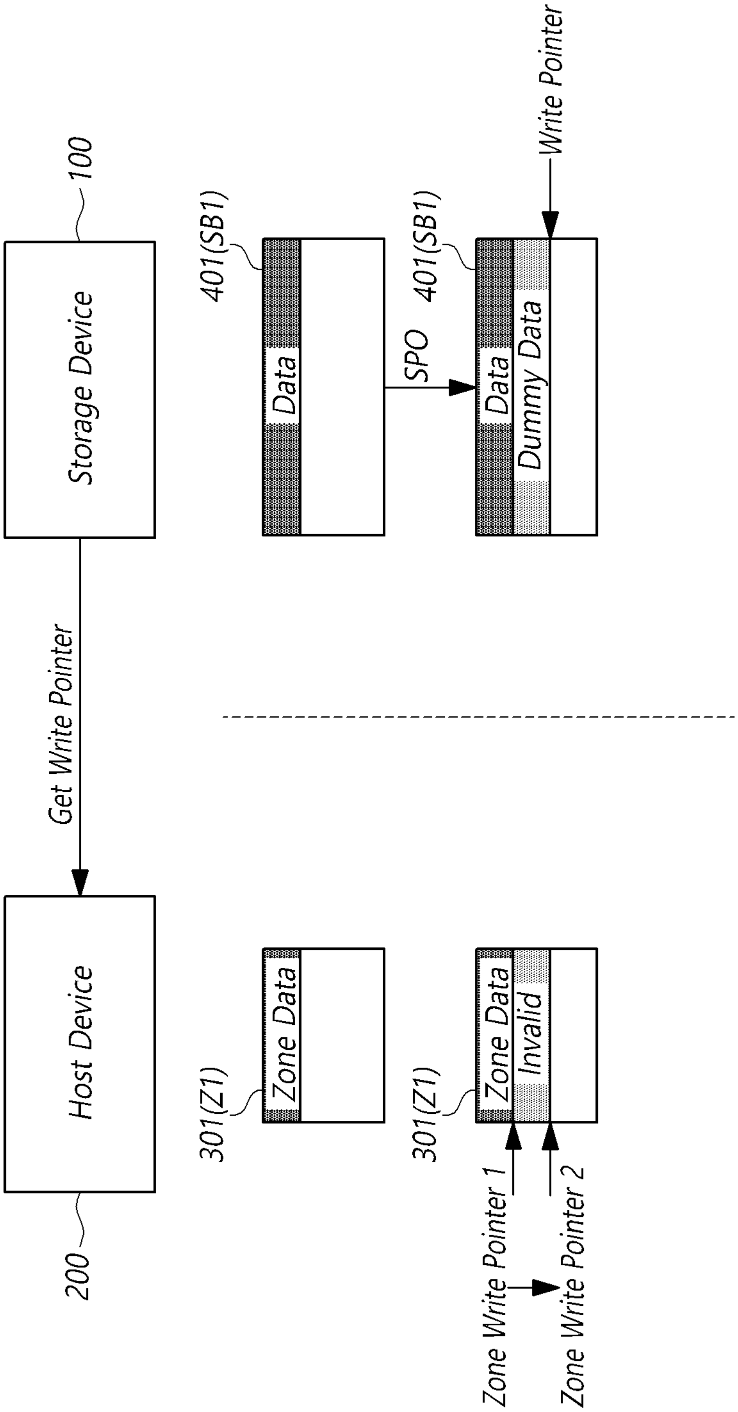
FIGS. 16 and 17 are diagrams illustrating methods in which a host device operates after a sudden power-off of a storage device in a computing system according to embodiments of the disclosure.
Figure 17:
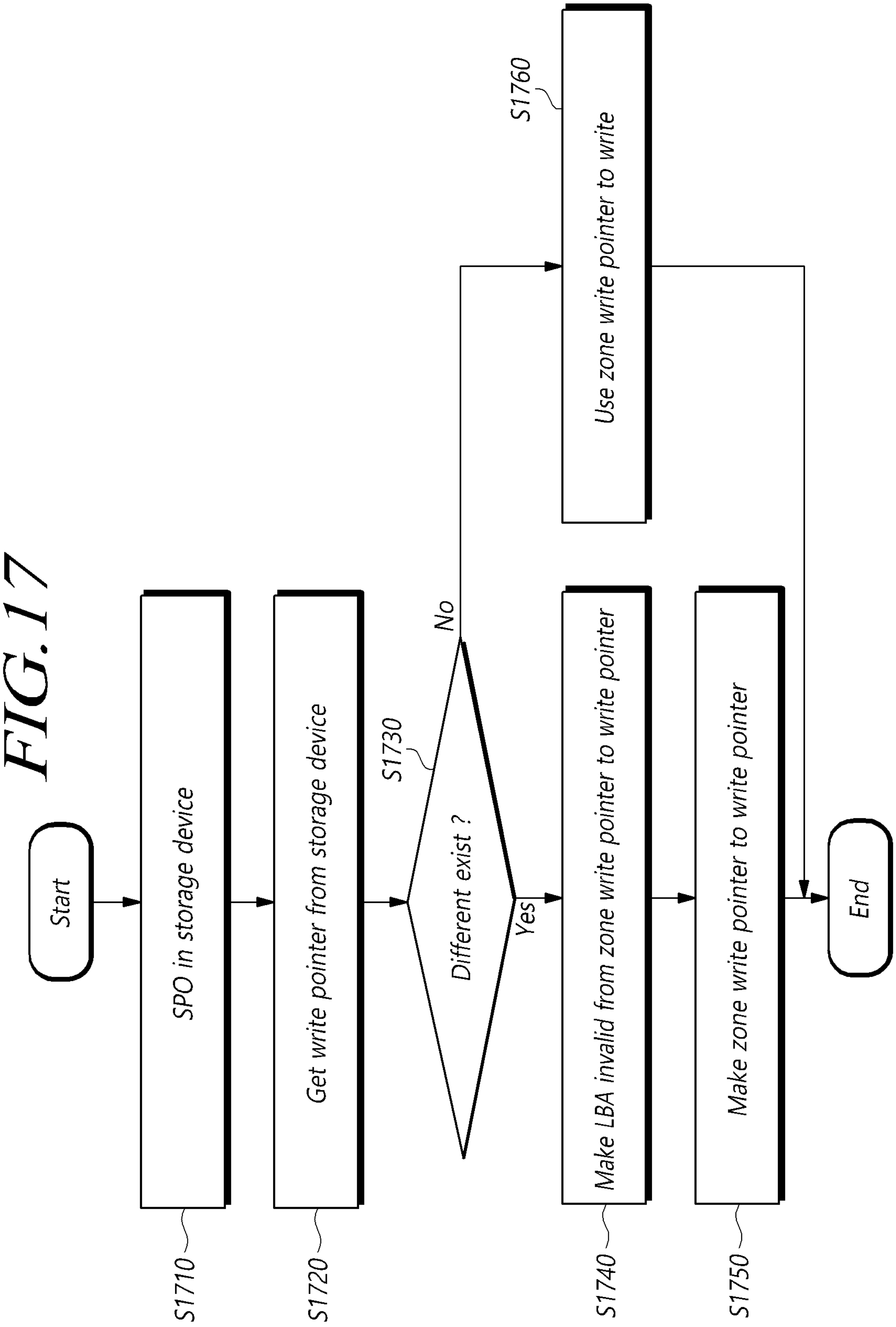

FIGS. 16 and 17 are diagrams illustrating methods in which a host device operates after a sudden power-off of a storage device in a computing system according to embodiments of the disclosure.

Referring to FIG. 16, a host device 200 may set a first zone 301. A storage device 100 may set a first storage block 401 corresponding to a first zone 301.

Data may be written to the first storage block 401 corresponding to the first zone 301 according to a command of the host device 200. As the host device 200 writes zone data to the first zone 301, data may be written to the first storage block 401 by the storage device 100.

A sudden power-off may occur during the operation of the storage device 100. When a sudden power-off occurs, the storage device 100 may perform an operation for recovering the sudden power-off.

For example, when a sudden power-off occurs, in order to preserve data integrity, the storage device 100 may write dummy data to a predetermined region according to a write pointer at a time point when the sudden power-off occurs. The dummy data may be written successively when the sudden power-off occurs.

In this case, a zone write pointer for a zone 300 managed by the host device 200 may not match a write pointer for a storage block 400 of the storage device 100. Since management of the storage block 400 by the zone 300 cannot be performed by the host device 200, the corresponding storage block 400 cannot be used, which may result in the waste of the zone 300.

In an embodiment, in order to prevent the waste of the zone 300 due to the sudden power-off, the host device 200 may receive the write pointer of the storage block 400 from the storage device 100 when recovery from the sudden power-off is completed. The host device 200 may request and receive a write pointer. When recovery according to a sudden power-off is completed, the storage device 100 may transfer the write pointer of each storage block 400 to the host device 200.

For example, when a sudden power-off occurs in the storage device 100 while setting and managing the first zone 301 and power-off recovery is completed, the host device 200 may receive a write pointer for the first storage block 401 corresponding to the first zone 301 from the storage device 100.

The host device 200 may compare the write pointer received from the storage device 100 with a zone write pointer set for the first zone 301.

When the write pointer received from the storage device 100 is the same as the zone write pointer set for the first zone 301, the host device 200 may transfer a write command for the first zone 301 to the storage device 100 on the basis of the zone write pointer. According to the write command received from the host device 200, the storage device 100 may write data to a region of the first storage block 401 corresponding to the first zone 301.

Alternatively, the zone write pointer set for the first zone 301 in the host device 200 may be different from the write pointer received from the storage device 100.

For example, the zone write pointer set for the first zone 301 in the host device 200 may be a first zone write pointer different from the write pointer received from the storage device 100. The host device 200 may change the first zone write pointer to a second zone write pointer to match the write pointer received from the storage device 100.

The host device 200 may set a region between a location indicated by the second zone write pointer and a location indicated by the unchanged first zone write pointer as an invalid region.

The host device 200 may perform a write operation on the first zone 301 using the second zone write pointer. Data may be written to a region indicated by a write command transferred to the storage device 100 by the host device 200.

After the sudden power-off and after recovery due to the sudden power-off is completed, data according to the first zone 301 may be written successively to the region where the dummy data of the first storage block 401 is written. Even when a sudden power-off occurs, a storage block 400 to which dummy data is written may not be wasted, and data may be written to the storage block 400 through a zone 300 corresponding to the storage block 400. Waste of the storage block 400 by a recovery operation according to the sudden power-off may be prevented.

In FIG. 17 operations of the storage device 100 and the host device 200 as described above includes a sudden power-off occurring in the storage device 100 (S1710). A recovery operation according to the sudden power-off may be performed in the storage device 100.

The host device 200 may obtain a write pointer from the storage device 100 (S1720).

The host device 200 may check whether the write pointer obtained from the storage device 100 matches the zone write pointer of a corresponding zone 300 (S1730).

When the write pointer obtained from the storage device 100 is different from the zone write pointer of the corresponding zone 300, the host device 200 may set a region, between the zone write pointer and the write pointer, as an invalid region in the corresponding zone 300 (S1740).

The host device 200 may change the zone write pointer to match the write pointer obtained from the storage device 100 (S1750).

The host device 200 may perform a write operation on the corresponding zone 300 according to the modified zone write pointer. A write operation on a storage block 400 corresponding to the zone 300 may be performed in the storage device 100. In the storage block 400, valid data may be written successively to dummy data according to recovery of the sudden power-off.

When the write pointer obtained from the storage device 100 matches the zone write pointer of the corresponding zone 300, the host device 200 may perform a write operation on the corresponding zone 300 on the basis of the zone write pointer (S1760). After recovery of the sudden power-off, data may be stably written to the storage block 400 of the storage device 100.

Even after a sudden power-off occurs and recovery due to the sudden power-off is completed in the storage device 100, a storage block 400 of the storage device 100 may be managed through management of a zone 300 by the host device 200. When performing recovery due to a sudden power-off, a storage block 400 to which dummy data is written and a zone 300 corresponding to the storage block 400 may be used without being wasted.

Where a change in a storage block 400 occurs due to the operation of the storage device 100, management on the storage block 400 of the storage device 100 may be performed while the correspondence relationship between a zone 300 of the host device 200 and the storage block 400 of the storage device 100 is maintained.

According to embodiments of the disclosure, even when out-of-order writing occurs in the storage device 100 according to a command of the host device 200, management of a storage block 400 may be performed while maintaining the relationship between a zone 300 and a corresponding storage block 400.

FIGS. 18 to 21 are diagrams illustrating methods in which a storage device operates according to an out-of-order data write command of a host device in a computing system according to embodiments of the disclosure.

Figure 18:
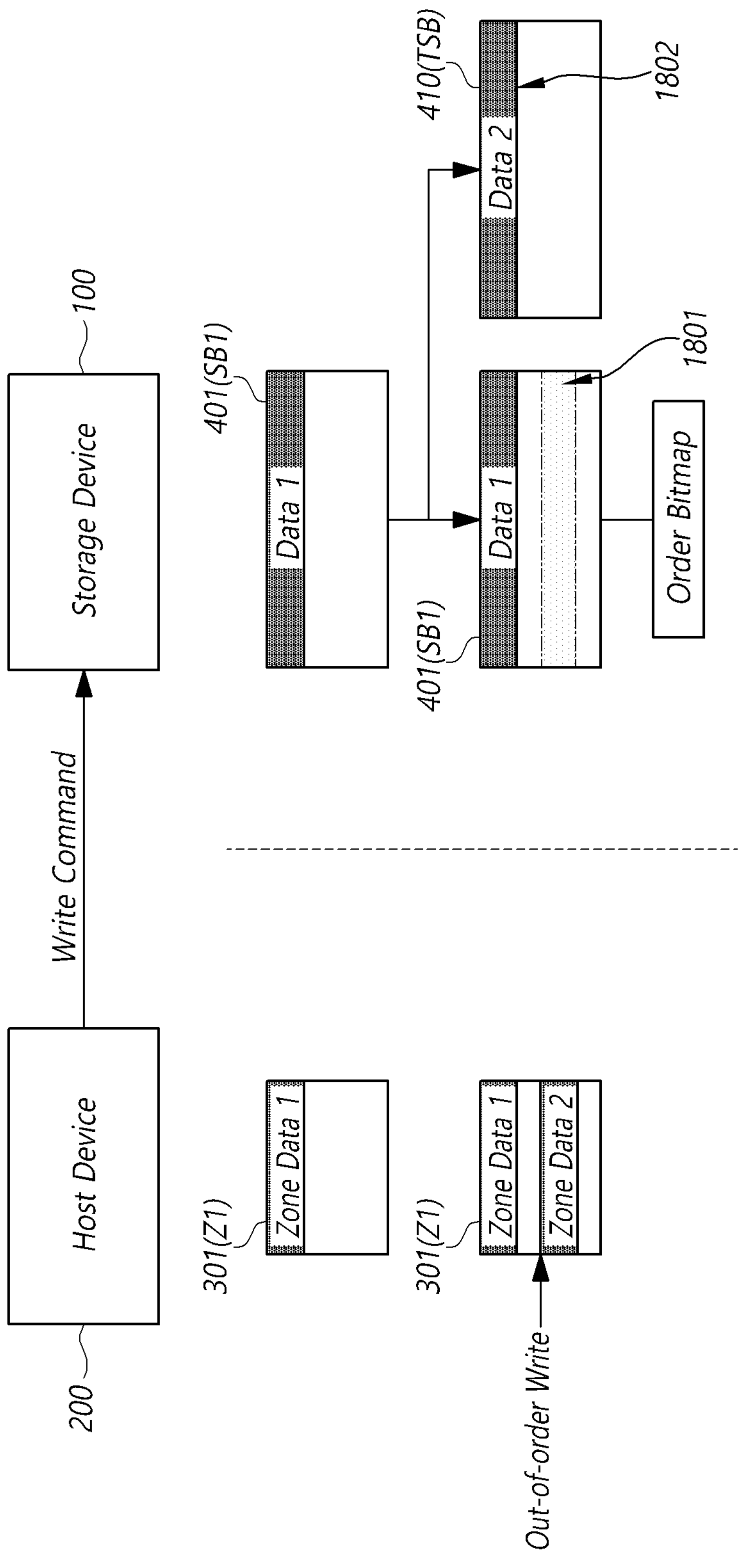
FIGS. 18 to 21 are diagrams illustrating methods in which a storage device operates according to an out-of-order data write command of a host device in a computing system according to embodiments of the disclosure.

Referring to FIG. 18, a host device 200 may set a first zone 301 and write first zone data in a first zone 301. The host device 200 may open the first zone 301 according to a command and a storage device 100 may set a first storage block 401 to correspond to the first zone 301. The storage device 100 may write first data to the first storage block 401 as the host device 200 writes the first zone data to the first zone 301 according to an operation or a command.

The host device 200 may write second zone data to the first zone 301. The second zone data written to the first zone 301 in the host device 200 may be out-of-order write data.

For example, in the host device 200, a layer that generates a write command and a layer that transfers the generated write command to the storage device 100 may be different layers. A write command generated in the host device 200 may be transferred to the storage device 100 according to the order in which it is generated. However, a write command may be transferred to the storage device 100 out of the order in which it is generated.

When the storage device 100 recognizes a write command of the host device 200 as a write command instructing that data be written out of order to the first storage block 401, the second zone data is written to the first zone 301 out of order and not in a manner that is successive to the writing of the first zone data.

In an embodiment, when receiving an out-of-order write command, the storage device 100 may write data to a storage block 400 that is different from the first storage block 401 corresponding to the first zone 301. For example, the storage device 100 may write second data according to the out-of-order write command to a temporary storage block 410.

When the storage device 100 writes the second data to the first storage block 401 according to the out-of-order write command, the second data cannot be written as indicated by 1801 in FIG. 18, and thus, a write operation on the first storage block 401 cannot be performed in a normal manner.

By writing the second data to the temporary storage block 410 as indicated by 1802 in FIG. 18, the storage device 100 may perform a write operation according to the out-of-order write command for the first storage block 401.

After writing the second data to the temporary storage block 410, the storage device 100 may set an order bitmap for the first storage block 401.

The order bitmap may include information on a region where data is written in the first storage block 401 or at least a part of a region where data is to be written in the first storage block 401. For example, the order bitmap may include information indicating a region where the first data is written and a region where the second data is to be written in correct order.

Alternatively, the order bitmap may include, for example, information indicating a region where the second data according to the out-of-order write command is to be written. A region where the second data is to be written to the first storage block 401 may be managed by the order bitmap.

The size of the order bitmap may be set based on the size of the first storage block 401.

Alternatively, the size of the order bitmap may be set based on the size of a region where data may be written in the first storage block 401. For example, the size of the order bitmap may be set to a size that corresponds to a region between a logical block address corresponding to the size of the first storage block 401 and a logical block address indicated by the write pointer of the first storage block 401. The size of the order bitmap may be equal to or smaller than the size of a region where data may be written in the first storage block 401.

Using the order bitmap set for the first storage block 401, the storage device 100 may manage a region where data is to be written according to the out-of-order write command for the first storage block 401.

When an out-of-order write command is generated for each storage block 400, the storage device 100 may separately set and manage an order bitmap for each storage block 400.

Figure 19:
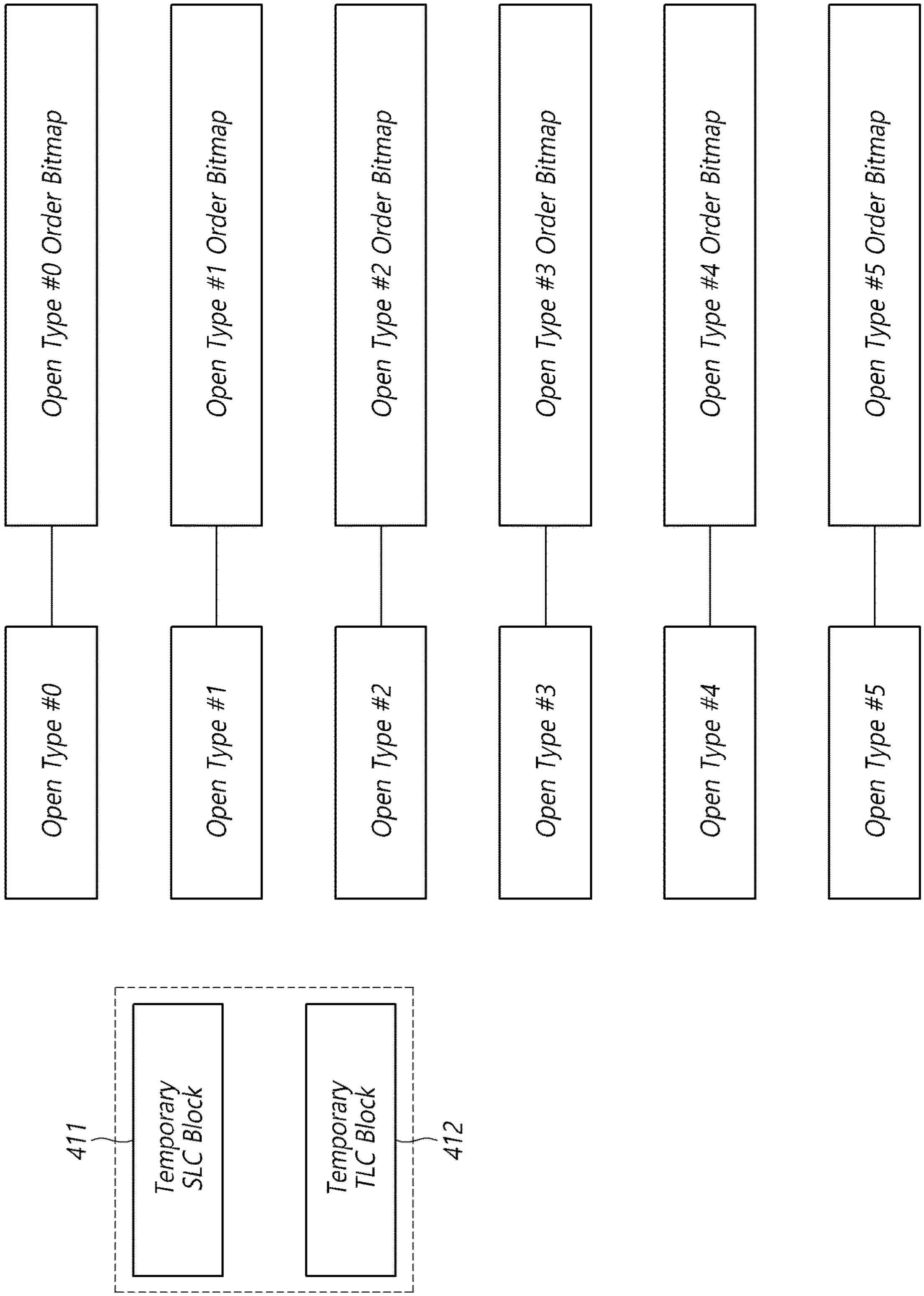

For example, referring to FIG. 19, an order bitmap may be set for each of six opened storage blocks 400. The six storage blocks 400 may be storage blocks 400 that store hot/warm/cold data or information on attributes of data or addresses where data is stored.

When performing a write operation according to an out-of-order write command, the storage device 100 may manage, through an order bitmap, a region where the out-of-order data is to be written, and the out-of-order data may be managed by being stored in the temporary storage block 410.

The temporary storage block 410 may be a single storage block 400, or may include at least two storage blocks 400. For example, the temporary storage block 410 may include a first temporary storage block 411 and a second temporary storage block 412.

For example, the first temporary storage block 411 may be a temporary storage block 410 in which memory cells are set as single-level cells.

For example, the second temporary storage block 412 may be a temporary storage block 410 in which memory cells are set as triple-level cells.

When writing data according to an out-of-order write command, the storage device 100 may select a temporary storage block 410 in which the out-of-order data is to be stored, depending on the size (length) of the data.

For example, when the size of data according to an out-of-order write command is smaller than a reference unit size, the storage device 100 may write the out-of-order data to the first temporary storage block 411. When the size of data according to an out-of-order write command is equal to or larger than the reference unit size, the storage device 100 may write the out-of-order data to the second temporary storage block 412.

The temporary storage block 410 to which the out-of-order data is to be temporarily written is determined depending on the size of data according to the out-of-order write command. Therefore, even when an out-of-order write command for each of the plurality of storage blocks 400 is generated, data according to the out-of-order write command may be managed through the temporary storage block 410 until it is written to each storage block 400.

After writing the second data according to the out-of-order write command for the first storage block 401 to the temporary storage block 410, the storage device 100 may receive a new write command.

The storage device 100 may check whether the new write command is an in-order write command or an out-of-order write command.

When the new write command is an out-of-order write command, the storage device 100 may write data according to the new write command to the temporary storage block 410. The storage device 100 may update the order bitmap for the first storage block 401 according to the new write command. The data according to the out-of-order write command may be managed by the order bitmap and the temporary storage block 410.

When the new write command is an in-order write command, the storage device 100 may determine whether to write data according to the new write command to the first storage block 401.

For example, when the data according to the new write command is data to be written in a region between the previously written first data and the second data corresponding to the out-of-order write command, the storage device 100 may write the data according to the new write command to the first storage block 401. Then, the storage device 100 may migrate the second data written to the temporary storage block 410 to the first storage block 401. The storage device 100 may initialize or clear the order bitmap for the first storage block 401.

Accordingly, data is written in order to the first storage block 401 according to the new write command is written.

For example, when the data according to the new write command is data that is smaller than the size of the region between the previously written first data and the second data corresponding to the out-of-order write command, the storage device 100 may write the corresponding data to the temporary storage block 410. The storage device 100 may update the order bitmap according to the new write command. And when all write commands for data to be written to the region between the first data and the second data are received, the storage device 100 may perform an in-order write operation on the first storage block 401. For another example, when the data according to the new write command is data that is equal to the size of the region between the previously written first data and the second data corresponding to the out-of-order write command, the storage device 100 may perform an in-order write operation on the first storage block 401.

When the data according to the new write command is smaller than the size of the region between the previously written first data and the second data corresponding to the out-of-order write command, the storage device 100 may write the out-of-order data to the first storage block 401 when the out-of-order data is to be written in succession after the region where the first data is written. The storage device 100 may update the order bitmap according to writing of the out-of-order data, and may manage the order bitmap until all write commands for data to be written to the region between the first data and the second data are received.

Since the storage device 100 manages a write operation and data according to an out-of-order write command using an order bitmap and the temporary storage block 410, even though an out-of-order write command is generated due to the structures in the host device 200, the storage device 100 may manage data to be written in order to a storage block 400.

Figure 20:
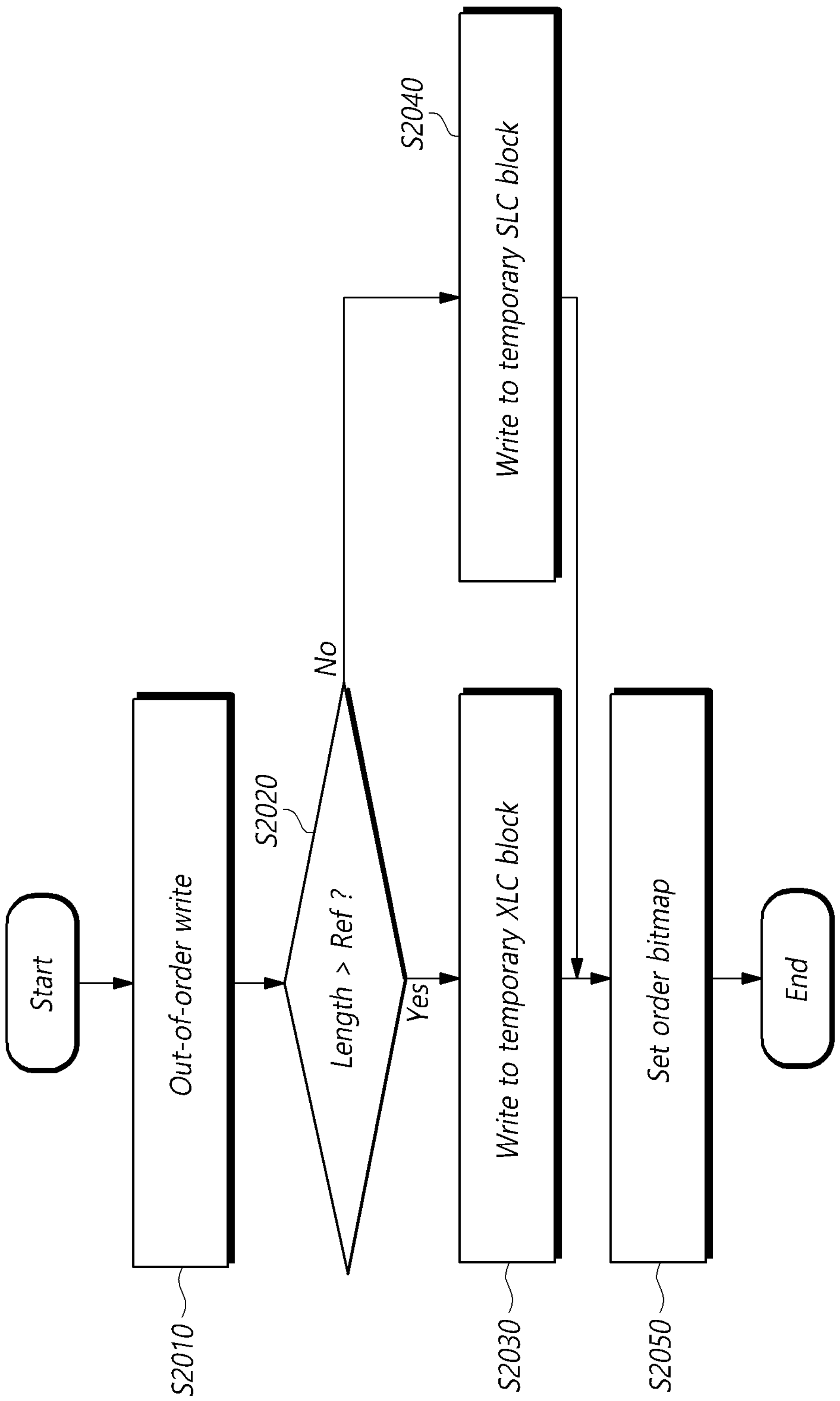
Figure 21:
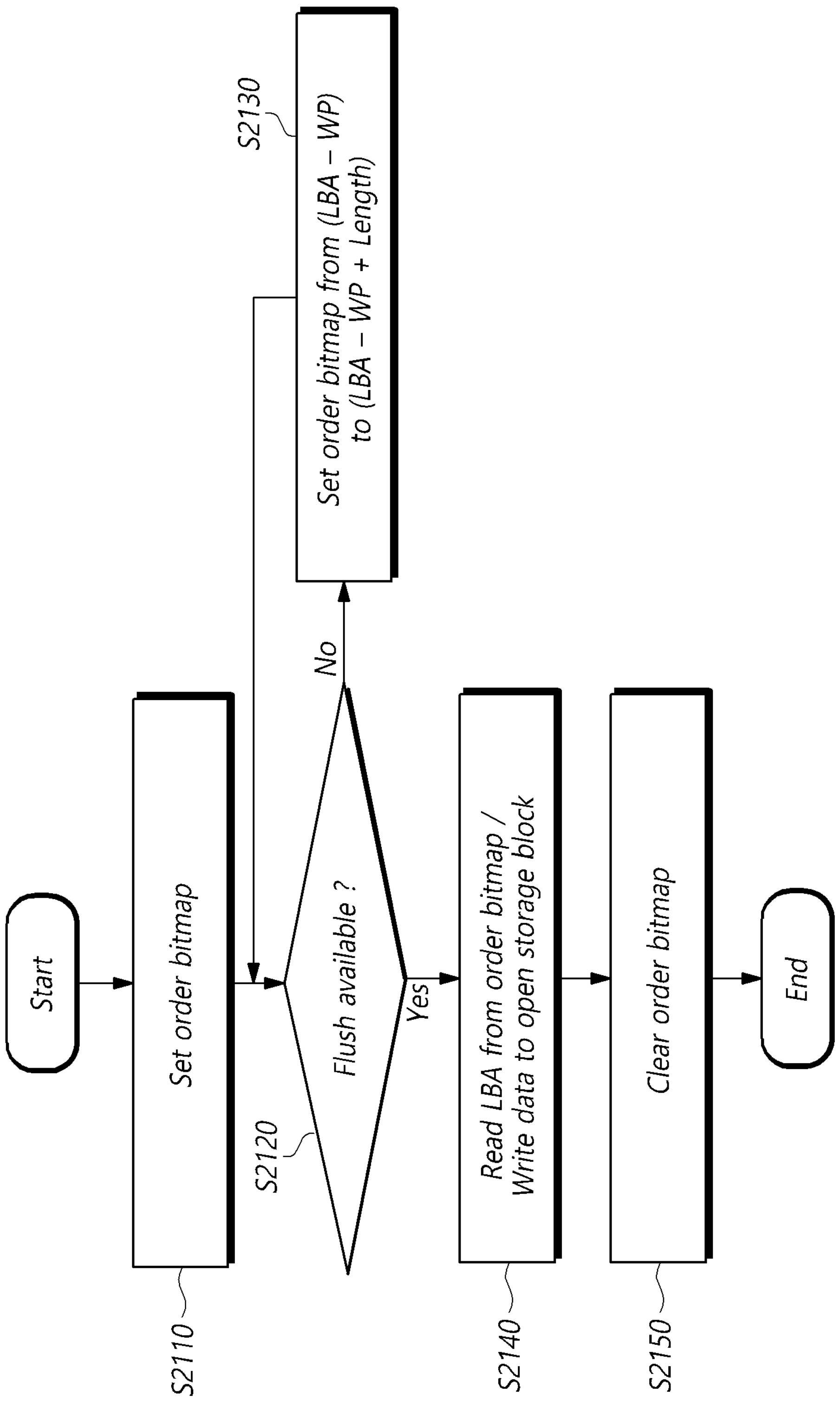

In FIGS. 20 and 21, operations of the storage device 100 as described above include the storage device 100 receiving an out-of-order write command from the host device 200 (S2010).

The storage device 100 may compare the size of data according to the out-of-order write command with the reference unit size (S2020).

When the size of the data according to the out-of-order write command is equal to or larger than the reference unit size, the storage device 100 may write the corresponding data to the second temporary storage block 412, which includes memory cells that are each capable of storing 2 or more-bit data (S2030).

When the size of the data according to the out-of-order write command is smaller than the reference unit size, the storage device 100 may write the corresponding data to the first temporary storage block 411, which includes memory cells set as single-level cells (S2040).

When the data according to the out-of-order write command is written to the temporary storage block 410, the storage device 100 may set an order bitmap for a corresponding storage block 400 (S2050). The order bitmap may include information indicating a region to which the data according to the out-of-order write command is to be written in the corresponding storage block 400.

Referring to FIG. 21, after setting the order bitmap (S2110), the storage device 100 may check whether it is in a state in which the data written to the temporary storage block 410 may be exported to the corresponding storage block 400 (S2120).

For example, when receiving a new write command, the storage device 100 may determine whether to flush the data written to the temporary storage block 410.

When the data written to the temporary storage block 410 is not to be written in succession to data written according to the new write command, the storage device 100 may update the order bitmap (S2130).

For example, the storage device 100 may set the order bitmap for a region corresponding to the difference between a logical block address included with the new write command and the write pointer of the storage block 400, and the storage device 100 may set the region to include the length of the data corresponding to the new write command.

By setting, in the order bitmap, a region that is separated from a location indicated by the write pointer and to which the data according to the new write command is to be written, the storage device 100 may manage the region to which the data according to the new write command is subsequently to be written.

When the data written to the temporary storage block 410 may be written to the corresponding storage block 400, the storage device 100 may read a logical block address from the order bitmap, and may write the data written to the temporary storage block 410 to the corresponding storage block 400 (S2140).

When the data written to the temporary storage block 410 is written to the corresponding storage block 400 and the storage block 400 is in a state in which data is written in order, the storage device 100 may clear the order bitmap for the corresponding storage block 400.

In the storage device 100, by using an order bitmap and the temporary storage block 410, a write operation according to an out-of-order write command of the host device 200 may be managed such that the commands are performed in a way that results in data that is written in order. It is possible to process an out-of-order write command that may be generated when the host device 200 manages the storage blocks 400 of the storage device 100 on the basis of the zones 300, and data may be written in order to the storage blocks 400 corresponding to the zones 300 according to the zones 300 in the storage device 100.

The foregoing embodiments are briefly described below.

A storage device according to embodiments of the disclosure may comprise at least one memory including a plurality of storage blocks, and a memory controller configured to control an operation of the at least one memory and to receive a command based on a zone, from among a plurality of zones, that corresponds to a storage block from among the plurality of storage blocks, the command including at least one of cell type information and usage frequency information.

The cell type information may be information indicating a cell type of memory cells in the storage block corresponding to the zone.

The cell type information may be information indicating a signal-level cell type or a non-single-level cell type.

The usage frequency information may be a frequency of access to data written to the zone.

The command may further include a valid page count information.

The usage frequency information may change depending on the number of changes in the valid page count information for the plurality of zones.

The command may be a write command that instructs writing data to the storage block.

The command may be an open zone command that instructs the opening of the storage block corresponding to the zone.

The memory controller may set, according to the cell type information, a cell type of memory cells that are included in the storage block corresponding to the zone, and perform an operation on the storage block according to the command.

The memory controller may receive a write command based on the zone corresponding to the storage block with memory cells of a single-level cell type, and the write command may include cell type information indicating a cell type other than the single-level cell type.

The memory controller may migrate data written to the storage block with memory cells of the single-level cell type to a storage block with memory cells of a cell type indicated by the cell type information included in the write command.

The memory controller may select the storage block corresponding to the zone based on the usage frequency information for each of the plurality of zones and accumulated usage information for each of the plurality of storage blocks.

When the usage frequency information of a zone is equal to or greater than a first threshold value, the memory controller may select, from among the plurality of storage blocks, a storage block whose accumulated usage information is smaller than a first reference value, to be set to correspond to the zone.

When the usage frequency information of a zone is smaller than a second threshold value, the memory controller may select, from among the plurality of storage blocks, a storage block whose accumulated usage information is equal to or greater than a second reference value, to be set to correspond to the zone.

A host device according to embodiments of the disclosure may comprise a host memory configured to store zone meta information for a zone, from among a plurality of zones, set to correspond to a storage block, from among a plurality of storage blocks, in a memory located in a storage device external to the host device, and a host controller configured to transfer a command based on the zone to the storage device, the command including at least one of cell type information and usage frequency information.

A computing system according to embodiments of the disclosure may comprise a storage device including at least one memory, and a host device configured to transfer, to the storage device, a command based on a zone, among a plurality of zones, set to correspond to a storage block, among a plurality of storage blocks that are included in the at least one memory, the command including at least one of cell type information and usage frequency information.

The host device may transfer, to the storage device, at least one of an open zone command and a write command including the cell type information.

The host device may transfer the open zone command including the cell type information to the storage device, and then, transfer a first write command without the cell type information to the storage device.

After transferring the first write command to the storage device, the host device may transfer a second write command including the cell type information to the storage device, and the cell type information included in the second write command is different from the cell type information included in the open zone command.

A storage device according to embodiments of the disclosure may comprise at least one memory including a plurality of storage blocks, and a memory controller configured to receive a command based on a zone, from among a plurality of zones, set to correspond to a storage block, from among the plurality of storage blocks including a first open storage block and a second open storage block, and when receiving a garbage collection command for a first zone and a second zone, configured to copy data of the first open storage block corresponding to the first zone to the second open storage block corresponding to the second zone using a valid data bitmap of the first zone.

The memory controller may receive the valid data bitmap of the first zone from a host device that transfers the garbage collection command.

When the data of the first open storage block is copied, the memory controller may transfer a garbage collection completion signal to the host device that transfers the garbage collection command.

When receiving the garbage collection completion signal, the host device may clear the valid data bitmap of the first zone.

When receiving the garbage collection completion signal, the host device may create or modify a valid data bitmap of the second zone.

The memory controller may read the valid data bitmap of the first zone from a host memory included in a host device that transfers the garbage collection command.

The host device may load the valid data bitmap of the first zone into the host memory and transfer the garbage collection command.

When the data of the first open storage block is copied, the memory controller may clear the valid data bitmap of the first zone stored in the host memory.

When the valid data bitmap of the first zone is cleared, the host device may create or modify a valid data bitmap of the second zone.

The garbage collection command may be transferred after an operation of copying data of the first zone to the second zone.

The memory controller may read data at a valid logical block address of the first zone obtained through the valid data bitmap, and write the data at the valid logical block address of the first zone to a logical block address of the second zone.

A host device according to embodiments of the disclosure may comprise a host memory, and a host controller configured to transfer a garbage collection command for a first zone and a second zone to a storage device, and to transfer a valid data bitmap of the first zone to the storage device or load the valid data bitmap of the first zone into the host memory.

A computing system according to embodiments of the disclosure may comprise a storage device including at least one memory, and a host device including a plurality of zones and configured to transfer, to the storage device, a command based on a zone, from among the plurality of zones, set to correspond to a storage block, from among a plurality of storage blocks, included in the at least one memory, wherein, when receiving from the host device a garbage collection command for a first zone and a second zone, from among the plurality of zones, the storage device copies data of a first open storage block corresponding to the first zone to a second open storage block corresponding to the second zone using a valid data bitmap of the first zone.

The storage device may receive the valid data bitmap of the first zone from the host device, or read the valid data bitmap of the first zone from a host memory included in the host device.

When copying of the data of the first open storage block is completed, the host device may create or modify a valid data bitmap of the second zone.

A storage device according to embodiments of the disclosure may comprise at least one memory including a plurality of open storage blocks, and a memory controller configured to receive a write command based on a zone, included in a plurality of zones, set to correspond to a storage block included in the plurality of open storage blocks, to write data to a first open storage block among the plurality of open storage blocks according to the write command, and to increase a cold point of the first open storage block and increase a cold point of at least one open storage block other than the first open storage block.

The first open storage block may include memory cells of a single-level cell type.

The at least one open storage block whose cold point is increased may include memory cells of a single-level cell type.

The memory controller may increase a cold point of a second open storage block other than the first open storage block, and, when the cold point of the second open storage block is equal to or greater than a first threshold value, migrate data written to the second open storage block to a third open storage block.

A cell type of memory cells that are included in the third open storage block may be different from a cell type of memory cells which are included in the second open storage block.

A cell type of memory cells that are included in the third open storage block may be a cell type other than a single-level cell type.

A cell type of memory cells that are included in the second open storage block may be maintained as a single-level cell type.

The second open storage block may be used as a storage block for a write booster.

When a remaining size of an open storage block for a write booster from among the plurality of open storage blocks is smaller than a reference margin, the memory controller may select a different open storage block to which data written to the open storage block is to be migrated.

When, among the plurality of open storage blocks, a remaining size of an open storage block, whose cold point is smaller than a second threshold value, is smaller than a reference margin, the memory controller may select a different open storage block to which data written to at least one among the plurality of open storage blocks for a write booster is to be migrated.

The memory controller may increase a cold point of a second open storage block and a cold point of a third open storage block, the second open storage block and the third open storage block are open storage blocks other than the first open storage block, and when the cold point of the second open storage block and the cold point of the third open storage block are the same, migrate data written to an open storage block whose written data has a smaller size between the second open storage block and the third open storage block, to a different open storage block.

The cold point of the second open storage block and the cold point of the third open storage block may be equal to or greater than the first threshold value.

An increase in the cold point may vary depending on a size of data written to the at least one open storage block.

The memory controller may perform at least one of garbage collection and wear leveling based on the cold point of the first open storage block and the cold point of the at least one open storage block.

A computing system according to embodiments of the disclosure may comprise a storage device including at least one memory, and a host device configured to transfer, to the storage device, a write command based on a zone from among a plurality of zones set to correspond to a storage block from among a plurality of storage blocks included in the at least one memory, wherein the storage device may write data to a first open storage block from among a plurality of open storage blocks according to the write command, decrease a cold point of the first open storage block, and increase a cold point of at least one open storage block other than the first open storage block.

A storage device according to embodiments of the disclosure may comprise at least one memory including a plurality of open storage blocks, and a memory controller configured to receive a write command based on a zone, from among a plurality of zones, that corresponds to an open storage block, from among the plurality of open storage blocks, and when a first logical block address according to a first write command does not match a write pointer of an open storage block, write data according to the first write command to a temporary storage block other than the open storage block and to set an order bitmap of the open storage block.

The memory controller may set the order bitmap based on a difference between the first logical block address and the write pointer, and a length of the data.

When receiving a second write command after receiving the first write command, the memory controller may select an open storage block to write data according to the second write command, based on whether a second logical block address of the second write command and the write pointer of the open storage block match each other.

When the second logical block address according to the second write command does not match the write pointer of the open storage block, the memory controller may write the data according to the second write command to the temporary storage block and update the order bitmap of the open storage block.

When the second logical block address according to the second write command matches the write pointer of the open storage block and a size of the data according to the second write command does not correspond to a difference between the first logical block address and the second logical block address, the memory controller may write the data according to the second write command to the temporary storage block and update the order bitmap of the open storage block.

When the second logical block address according to the second write command matches the write pointer of the open storage block and a size of the data according to the second write command corresponds to a difference between the first logical block address and the second logical block address, the memory controller may write the data according to the second write command to the open storage block.

When writing the data according to the second write command to the open storage block, the memory controller may migrate the data written to the temporary storage block to the open storage block and initialize the order bitmap of the open storage block.

When a size of the data is smaller than a reference unit size, the memory controller may write the data to a first temporary storage block, and when a size of the data is equal to or larger than the reference unit size, the memory controller may write the data to a second temporary storage block, and wherein a cell type of memory cells that are included in the first temporary storage block may be different from a cell type of memory cells that are included in the second temporary storage block.

The first temporary storage block may include memory cells of a single-level cell type, and the second temporary storage block may include memory cells of a cell type other than the single-level cell type.

A size of the order bitmap may be smaller than a size of the open storage block.

A size of the order bitmap may correspond to a difference between the write pointer and a last logical block address of the open storage block.

A computing system according to embodiments of the disclosure may comprise a storage device including at least one memory, and a host device configured to transfer, to the storage device, a write command based on a zone, from among a plurality of zones, that corresponds to an open storage block from among a plurality of open storage blocks included in the at least one memory, wherein, when a logical block address according to the write command does not match a write pointer of an open storage block, the storage device may write data according to the write command to a temporary open storage block other than the open storage block and set an order bitmap of the open storage block.

A storage device according to embodiments of the disclosure may comprise at least one memory including a plurality of open storage blocks, and a memory controller configured to receive, from a host device, a command based on a zone, from among a plurality of zones, set to correspond to an open storage block from among the plurality of open storage blocks, to control an operation of the at least one memory according to the command, and when a sudden power-off occurs, to transfer write pointer information of at least one open storage block to the host device.

When the sudden power-off occurs, the memory controller may write dummy data to a partial region of the at least one open storage block, and wherein, when receiving a write command from the host device, the memory controller may write new data according to the write command to the at least one open storage block including the partial region to which the dummy data is written.

The memory controller may write the new data to a region other than the partial region to which the dummy data is written.

The memory controller may write the new data to a region in succession after the partial region to which the dummy data is written.

When receiving the write pointer information from the memory controller, the host device may compare the write pointer information with zone write pointer information managed by the host device, and when the zone write pointer information is different from the write pointer information, modify the zone write pointer information to match the write pointer information.

The host device may set a region, between a write pointer according to the write pointer information and a write pointer according to the zone write pointer information, as an invalid region.

When receiving the write pointer information from the memory controller, the host device may compare the write pointer information with zone write pointer information managed by the host device, and when the zone write pointer information matches the write pointer information, transfer a write command according to the zone write pointer information to the memory controller.

After the sudden power-off, the host device may transfer open zone commands to the memory controller according to order in which zones are opened before the sudden power-off.

A host device according to embodiments of the disclosure may comprise a host memory configured to store zone meta information for a zone from among a plurality of zones that corresponds to an open storage block from among a plurality of open storage blocks that are included in at least one memory located outside the host device, and a host controller configured to transfer a command based on the zone to a storage device including the at least one memory, receive write pointer information of at least one open storage block from the storage device when a sudden power-off of the storage device occurs, and, based on the write pointer information, modify zone write pointer information or transfer a write command based on the zone write pointer information to the storage device.

A computing system according to embodiments of the disclosure may comprise a storage device including at least one memory, and a host device configured to transfer, to the storage device, a command based on a zone, from among a plurality of zones, set to correspond to an open storage block from among a plurality of open storage blocks included in the at least one memory, wherein, when a sudden power-off occurs, the storage device may write dummy data to a partial region of at least one open storage block, and transfer write pointer information of the at least one open storage block to the host device.

The host device may compare the write pointer information with zone write pointer information managed by the host device, and when the zone write pointer information is different from the write pointer information, modify the zone write pointer information to match the write pointer information.

When the zone write pointer information is different from the write pointer information, the host device may set a region, between a write pointer according to the write pointer information and a write pointer according to the zone write pointer information, as an invalid region.

The host device may compare the write pointer information with zone write pointer information managed by the host device, and when the zone write pointer information matches the write pointer information, transfer a write command according to the zone write pointer information to the storage device.

The host device may transfer, to the storage device, a write command based on a zone corresponding to the at least one open storage block including the partial region to which the dummy data is written.

Although various embodiments of the disclosed technology have been described with particular specifics and varying details for illustrative purposes, those skilled in the art will appreciate that various modifications, additions and substitutions may be made based on what is disclosed or illustrated in the disclosed technology without departing from the spirit and scope of the disclosed technology as defined in the following claims.

What is claimed is:

1. A storage device comprising:

at least one memory including a plurality of storage blocks; and a memory controller configured to control an operation of the at least one memory and to receive a command based on a zone, from among a plurality of zones configured by a host device, that corresponds to a storage block from among the plurality of storage blocks, the command including at least one of cell type information and usage frequency information, wherein, the cell type information of the zone is configured by the host device, and the memory controller sets, according to the cell type information, a cell type of memory cells that are included in the storage block corresponding to the zone, and performs an operation on the storage block according to the command, and the cell type indicates whether the memory cells are first level cells or second level cells, wherein a number of bits stored in the second level cells is greater than a number of bits stored in the first level cells, wherein the memory controller is configured to receive an open zone command including the cell type information without data to be written, wherein the memory controller receives a write command with data to be written without the cell type information and the memory controller is configured to write the data according to the write command in the storage block that corresponds to the zone according to the open zone command and that has a cell type indicated by the cell type information, and wherein when the memory controller receives a write command with a cell type information, the memory controller is configured to compare the cell type information included in the write command with the cell type information included in the open zone command, and if the cell type information included in the write command is different from the cell type information included in the open zone command, the memory controller is configured to migrate the data written in the storage block that corresponds to the zone according to the open zone command to a different storage block that has a cell type indicated by the cell type information included in the write command.

2. The storage device according to claim 1, wherein the cell type information is information indicating a cell type of memory cells in the storage block corresponding to the zone.

3. The storage device according to claim 1, wherein the cell type information is information indicating a single-level cell type or a non-single-level cell type.

4. The storage device according to claim 1, wherein the usage frequency information is a frequency of access to data written to the zone.

5. The storage device according to claim 1, wherein the command further includes a valid page count information.

6. The storage device according to claim 5, wherein the usage frequency information changes depending on a number of changes in the valid page count information for the plurality of zones.

7. The storage device according to claim 1, wherein the memory controller receives a write command based on the zone corresponding to the storage block with memory cells of a single-level cell type, and the write command includes cell type information indicating a different cell type from the single-level cell type.

8. The storage device according to claim 1, wherein the memory controller selects the storage block corresponding to the zone based on the usage frequency information for each of the plurality of zones and accumulated usage information for each of the plurality of storage blocks.

9. The storage device according to claim 8, wherein, when the usage frequency information of a zone is equal to or greater than a first threshold value, the memory controller selects, from among the plurality of storage blocks, the storage block whose accumulated usage information is smaller than a first reference value, to be set to correspond to the zone.

10. The storage device according to claim 8, wherein, when the usage frequency information of a zone is smaller than a second threshold value, the memory controller selects, from among the plurality of storage blocks, the storage block whose accumulated usage information is equal to or greater than a second reference value, to be set to correspond to the zone.

11. A computing system comprising:

a storage device including at least one memory; and a host device configured to transfer, to the storage device, a command based on a zone, among a plurality of zones which are configured by the host device, set to correspond to a storage block, among a plurality of storage blocks that are included in the at least one memory, the command including at least one of cell type information and usage frequency information, wherein, the cell type information of the zone is configured by the host device, and the storage device sets, according to the cell type information, a cell type of memory cells that are included in the storage block corresponding to the zone, and performs an operation on the storage block according to the command, and the cell type indicates whether the memory cells are first level cells or second level cells, wherein a number of bits stored in the second level cells is greater than a number of bits stored in the first level cells, wherein the storage device receives an open zone command including the cell type information without data to be written from the host device, wherein the storage device receives a write command with data to be written without the cell type information from the host device, the storage device writes the data according to the write command in the storage block that corresponds to the zone according to the open zone command and that has a cell type indicated by the cell type information, and wherein when the storage device receives a write command with a cell type information, the storage device is configured to compare the cell type information included in the write command with the cell type information included in the open zone command, and if the cell type information included in the write command is different from the cell type information included in the open zone command, the storage device is configured to migrate the data written in the storage block that corresponds to the zone according to the open zone command to a different storage block that has a cell type indicated by the cell type information included in the write command.

12. The computing system according to claim 11, wherein the host device transfers, to the storage device, at least one of the open zone command and the write command including the cell type information.

13. The computing system according to claim 12, wherein the host device transfers the open zone command including the cell type information to the storage device, and then transfers a first write command without the cell type information to the storage device, and after transferring the first write command to the storage device, the host device transfers a second write command including the cell type information to the storage device, and the cell type information included in the second write command is different from the cell type information included in the open zone command.

* * * * *